us008507568B2

(12) United States Patent
Lee et al.

(10) Patent No.: US 8,507,568 B2
(45) Date of Patent: Aug. 13, 2013

(54) SUSPENSION POLYMERIZATION AND FOAMING OF WATER CONTAINING ACTIVATED CARBON-NANO/MICROPARTICULATE POLYMER COMPOSITES

(75) Inventors: Ly James Lee, Columbus, OH (US); Jintao Yang, Zhejiang (CN); Nan-Rong Chiou, Columbus, OH (US); Shu-Kai Yeh, Banqiao-Taipei (TW)

(73) Assignees: The Ohio State University, Columbus, OH (US); Nanomaterial Innovation Ltd, Columbus, OH (US)

( * ) Notice: Subject to any disclaimer, the term of this patent is extended or adjusted under 35 U.S.C. 154(b) by 777 days.

(21) Appl. No.: 12/539,465

(22) Filed: Aug. 11, 2009

(65) Prior Publication Data

US 2010/0099782 A1   Apr. 22, 2010

Related U.S. Application Data

(63) Continuation of application No. PCT/US2009/045511, filed on May 28, 2009.

(60) Provisional application No. 61/188,624, filed on Aug. 11, 2008, provisional application No. 61/130,061, filed on May 28, 2008.

(51) Int. Cl.
*C08J 9/00* (2006.01)

(52) U.S. Cl.
USPC .................. 521/53; 521/54; 521/82; 521/83; 521/146

(58) Field of Classification Search
USPC .................................. 521/53, 54, 82, 83, 146
See application file for complete search history.

(56) References Cited

U.S. PATENT DOCUMENTS

| | | | |
|---|---|---|---|
| 3,615,384 A | 10/1971 | Gipstein | |
| 4,107,354 A | 8/1978 | Wilkenloh et al. | |
| 4,473,665 A | 9/1984 | Martini-Vvedensky et al. | |
| 5,076,959 A | 12/1991 | Barker et al. | |
| 5,250,577 A | 10/1993 | Welsh | |
| 5,266,605 A | 11/1993 | Welsh | |
| 5,302,634 A | 4/1994 | Mushovic | |
| 5,366,675 A | 11/1994 | Needham | |
| 5,369,147 A | 11/1994 | Mushovic | |
| 5,373,026 A | 12/1994 | Bartz et al. | |
| 5,389,694 A | 2/1995 | Vo et al. | |
| 5,650,106 A | 7/1997 | Paquet et al. | |
| 5,674,916 A * | 10/1997 | Shmidt et al. .................... | 521/79 |
| 5,718,841 A | 2/1998 | Mardis et al. | |
| 5,827,362 A | 10/1998 | McLeod | |
| 5,866,053 A | 2/1999 | Park et al. | |
| 5,932,315 A | 8/1999 | Lum et al. | |
| 5,939,475 A | 8/1999 | Reynolds et al. | |
| 6,051,643 A | 4/2000 | Hasegawa et al. | |
| 6,069,183 A | 5/2000 | Wilkes et al. | |
| 6,117,932 A | 9/2000 | Hasegawa et al. | |
| 6,123,798 A | 9/2000 | Gandhi et al. | |
| 6,156,835 A | 12/2000 | Anderson et al. | |
| 6,176,962 B1 | 1/2001 | Soane et al. | |
| 6,268,046 B1 | 7/2001 | Miller et al. | |
| 6,271,272 B1 * | 8/2001 | Carlier et al. .................... | 521/56 |
| 6,271,297 B1 | 8/2001 | Ishida | |
| 6,342,540 B1 | 1/2002 | Gluck et al. | |
| 6,387,968 B1 * | 5/2002 | Gluck et al. .................... | 521/56 |
| 6,583,188 B2 | 6/2003 | Chaudhary et al. | |
| 6,602,373 B1 | 8/2003 | McGuire, Jr. | |
| 6,646,072 B2 | 11/2003 | Klendworth et al. | |
| 6,689,823 B1 | 2/2004 | Bellare et al. | |
| 6,696,022 B1 | 2/2004 | Chan et al. | |
| 6,759,446 B2 | 7/2004 | Lee et al. | |
| 7,026,365 B2 | 4/2006 | Lee et al. | |
| 7,122,093 B1 | 10/2006 | Lee et al. | |
| 7,129,287 B1 | 10/2006 | Lee et al. | |
| 2002/0125001 A1 | 9/2002 | Kelly et al. | |
| 2002/0127144 A1 | 9/2002 | Mehta | |
| 2003/0039816 A1 | 2/2003 | Wang et al. | |
| 2003/0205832 A1 | 11/2003 | Lee et al. | |
| 2004/0197793 A1 | 10/2004 | Hassibi et al. | |
| 2004/0241315 A1 | 12/2004 | Pui et al. | |
| 2005/0004243 A1 | 1/2005 | Lee et al. | |
| 2007/0117873 A1 | 5/2007 | Lee et al. | |
| 2007/0179206 A1 | 8/2007 | Miller et al. | |
| 2008/0248575 A1 | 10/2008 | Lee et al. | |

FOREIGN PATENT DOCUMENTS

| | | |
|---|---|---|
| EP | 1941537 A2 | 7/2008 |
| JP | 2004269583 A * | 9/2004 |
| WO | 00/15701 A1 | 3/2000 |
| WO | 00/75275 A2 | 12/2000 |
| WO | 01/26812 A1 | 4/2001 |
| WO | 01/86154 A1 | 11/2001 |
| WO | 2004/065461 A2 | 8/2004 |
| WO | 2004/074357 A1 | 9/2004 |
| WO | 2007/053802 A2 | 5/2007 |

OTHER PUBLICATIONS

Albouy, A. et al., Development of HFC Blowing Agents. Part II: Expanded Polystyrene Insulating Boards, Cellular Polymers, 17(3), pp. 163-176, 1998.
Almanza, O. et al., Measurement of the thermal diffusivity and specific heat capacity of polyethylene foams using the transient plane source technique, Polymer International, 53, pp. 2038-2044, 2004.
Almanza, O.A. et al., Prediction of the Radiation Tem in the Thermal Conductivity of Crosslinked Closed Cell Polyolefin Foams, Journal of Polymer Science: Part B: Polymer Physics, 38, pp. 993-1004, 2000.

(Continued)

Primary Examiner — Irina S Zemel
(74) Attorney, Agent, or Firm — Standley Law Group LLP

(57) ABSTRACT

Synthesis of polystyrene and/or other thermoplastic polymers or polymer blends which, for example, contain activated carbon and/or bamboo carbon carrying a co-blowing agent such as water and/or at least one of 1-dimensional, 2-dimensional, and 3-dimensional nano/micro-materials in suspension polymerization without using the inverse emulsion process. $CO_2$ or other blowing agent based foaming processes such as extrusion, batch foaming, and injection molding may then be carried out to produce polymer foams that have low density, high-R value, bimodal structures, good mechanical properties, and high fire retardance.

18 Claims, 9 Drawing Sheets

(56) References Cited

OTHER PUBLICATIONS

Crevecoeur, JJ. et al., Water expandable polystyrene (WEPS) Part 1. Strategy and procedures, Polymer, 40, pp. 3685-3689, 1999.

Crevecoeur, JJ. et al., Water expandable polystyrene (WEPS) Part 2. In-situ synthesis of (block)copolymer surfactants, Polymer, 40, pp. 3691-3696, 1999.

Crevecoeur, JJ. et al., Water expandable polystyrene (WEPS) Part 3. Expansion behaviour, Polymer, 40, pp. 3697-3702, 1999.

Daigneault, L.E. et al., Blends of CO2 and 2-Ethyl Hexanol as Replacement Foaming Agents for Extruded Polystyrene, Journal of Cellular Plastics, 37, pp. 262-272, May 2001.

Gibson, L.J. et al., Thermal, electrical and acoustic properties of foams, Cellular Solids, Chapter 7, pp. 283-308, 1999, Cambridge University Press.

Glicksman, Heat transfer in foams, Low Density Cellular Plastics, Chapter 5, pp. 104-152, 1994, Chapman & Hall, New York.

Li, R.H. et al., Poly (vinyl alcohol) synthetic polymer foams as scaffolds for cell encapsulation, J. Biomater. Sci. Polymer Edn, 9(3), pp. 239-258, 1998.

Pallay, J. et al., Expansion of polystyrene using water as the blowing agent, Macromol. Mater. Eng., 275, pp. 18-25, 2000.

Pallay, J. et al., Expansion of Polystyrene using Water as the Blowing Agent, Journal of Cellular Plastics, 43, pp. 371-383, Jul./Sep. 2007.

Pallay, J. et al., Water-blown Expandable Polystyrene. Improvement of the Compatibility of the Water Carrier with the Polystyrene Matrix by In Situ Grafting, Part I. Mechanism of free radical grafting, Cellular Polymers, 21(1), pp. 1-18, 2002.

Pallay, J. et al., Water-Blown Expandable Polystyrene. Improvement of the Compatibility of the Water Carrier with the Polystyrene Matrix by In Situ Grafting, Part II. Influence of compatibilization on the foam quality, Cellular Polymers, 21(1), pp. 19-33, 2002.

Shen, J. et al., Synthesis and foaming of water expandable polystyrene-clay nanocomposites, Polymer, 47, pp. 6303-6310, 2006.

Vo, C.V. et al., An Evaluation of the Thermal Conductivity of Extruded Polystyrene Foam Blown with HFC-134A or HCFC-142b, Journal of Cellular Plastics, 40, pp. 205-228, May 2004.

Wake, M.C. et al., Fabrication of Pliable Biodegradable Polymer Foams to Engineer Soft Tissues, Cell Transplantation, 5(4), pp. 465-473, 1996.

Yin, L.H. et al., Results of Retroviral and Adenoviral Approaches to Cancer Gene Therapy, Stem Cells, 16(suppl 1), pp. 247-250, 1998.

Ajavon, A-L. N. et al., United Nations Environment Programme. http://www.unep.org/ozone/sap2002.shtml, 41 pages, 2002.

Alcantar, N.A. et al., Polyethylene glycol-coated biocompatible surfaces, J. Biomed. Mater. Res. 51(3), pp. 343-351, 2000.

Alexandre, M. et al., Polymer-layered silicate nanocomposites: preparation, properties and uses of a new class of materials, Materials Science and Engineering, 28, pp. 1-63, 2000.

Balazs, A.C. et al., Modeling the Interactions Between Polymers and Clay Surfaces through Self-Consistent Field Theory, Macromolecules 31(23), pp. 8370-8381, 1998.

Baldwin, D.F. et al., Microcellular Poly(ethylene terephthalate) and Crystallizable Poly(ethylene terephthalate): Characterization of Process Variables, Annual Technical Conference—Society of Plastics Engineers, 50(1), pp. 1503-1507, 1992.

Bandyopadhyay, S. et al., Thermal and Thermo-Mechanical Properties of PMMA Nanocomposites, Polymeric Materials Science and Engineering, 75, pp. 208-209, 2000.

Barlow, C. et al., Impact Strength of High Density Solid-State Microcellular Polycarbonate Foams, Journal of Engineering Materials and Technology, 123, pp. 229-233, 2001.

Becker, H. et al., Polymer microfabrication methods for microfluidic analytical applications, Electrophoresis 21, pp. 12-26, 2000.

Biasci, L. et al., Functionalization of montmorillonite by methyl methacrylate polymers containing side-chain ammonium cations, Polymer 35(15), pp. 3296-3304, 1994.

Blumstein, A. et al., Polymerization of Adsorbed Monolayers. I. Preparation of the Clay-Polymer Complex, Journal of Polymer Science: Part A 3, pp. 2653-2664, 1965.

Bouma, R. et al., Foam Stability Related to Polymer Permeability. I. Low Molecular Weight Additives, Journal of Applied Polymer Science, 65, pp. 2679-2689, 1997.

Brown, J.M. et al., Thermoset-Layered Silicate Nanocomposites. Quaternary Ammonium Montmorillonite with Primary Diamine Cured Epoxies, Chem. Mater. 12(11), pp. 3376-3384, 2000.

Cao, X. et al, Polyeurethane/Clay Nanocomposites Foams: Processing, Structure, and Properties, Polymer, 46, pp. 775-783, 2005.

Capecchi, M., High Efficiency Transformation by Direct Microinjection of DNA into Cultured Mammalian Cells, Cell, 22, pp. 479-488, 1980.

Champagne, M. et al., Polymer Blending Technology in Foam Processing, R. Gendron, Editor, CRC Press LLC, Boca Raton, pp. 105-139, 2005.

Chen, J-H. et al., Surface Modification by a Two-Phase Deposition of a Surfactant, Journal of Colloid and Interface Science 142(2), pp. 544-553, 1991.

Chen, L. et al., Effect of Filler Size on Cell Nucleation during Foaming Process, ANTEC, pp. 1732-1736, 2001.

Chen, L. et al., Shear Stress Nucleation in Microcellular Foaming Process, Polymer Engineering and Science, 42 (6), pp. 1151-1158, 2002.

Cho, J.W. et al., Nylon 6 Nanocomposites by Melt Compounding, Polymer 42, pp. 1083-1094, 2001.

Cody, C.A. et al., Studies of Fundamental Organoclay Rheological Relationships, NLGI Spokesman, pp. 437-447, Jan. 1986.

Collias, D.I. et al. Impact Behavior of Microcellular Foams of Polystyrene and Styrene-Acrylonitrile Copolymer, and Single-Edge-Notched Tensile Toughness of Microcellular Foams of Polystyrene, Styrene-Acrylonitrile Copolymer, and Polycarbonate, Polymer Engineering and Science, 35(14), pp. 1178-1182, 1995.

Collias, D.I. et al., Tensile Toughness of Microcellular Foams of Polystyrene, Styrene-Acrylonitrile Copolymer, and Polycarbonate, and the Effect of Dissolved Gas on the Tensile Toughness of the Same Polymer Matrices and Microcellular Foams Polymer Engineering and Science, 35, pp. 1167-1177, 1995.

Colton, J. et al., The Nucleation of Microcellular Thermoplastic Foam With Additives: Part I: Theoretical Considerations, Polymer Engineering and Science, 27(7), 485-492, 1987.

Colton, J. et al., Nucleation of Microcellular Foam: Theory and Practice, Polymer Engineering and Science, 27(7), 500-503, 1987.

Colton, J.S. et al., The Nucleation of Mircrocellular Thermoplastic Foam With Additives: Part II: Experimental Results and Discussion, Polymer Engineering and Science, 27 (7), pp. 493-499, 1987.

Condo, P. et al., Glass Transitions of Polymers with Compressed Fluid Diluents: Type II and III Behavior, Macromolecules 27, pp. 365-371, 1994.

Cooper, A.I., Polymer synthesis and processing using supercritical carbon dioxide, J. Mater. Chem. 10(2), pp. 207-234, 2000.

Coulberson, A. et al., Gene packaging with lipids, peptides and viruses inhibits transfection by electroporation in vitro, Journal of Controlled Release, 86, pp. 361-370, 2003.

Di, Y. et al., Poly(Lactic) Acid/Organoclay Nanocomposites: Thermal, Rheological Properties and Foam Processing, Journal of Polymer Science, Part B: Polymer Physics, 43(6), pp. 689-698, 2005.

Di Maio, E. et al., Heterogeneous Bubble Nucleation in PCL/Clay Nanocomposite Foams, Plastics, Rubber and Composites, 32, pp. 313-317, 2003.

Dietsche, F. et al., Thermal properties and flammability of acrylic nanocomposites based upon organophilic layered silicates, Polymer Bulletin 43, pp. 395-402, 1999.

Dietsche, F. et al., Translucent Acrylic Nanocomposites Containing Anisotropic Laminated Nanoparticles Derived from Intercalated Layered Silicates, Journal of Applied Polymer Science 75, pp. 396-405, 2000.

Doh, J.G. et al., Synthesis and properties of polystyrene-organoammonium montmorillonite hybrid, Polymer Bulletin 41, pp. 511-518, 1998.

Doroudiani, S. et al., Characterization of Microcellular Foamed HDPE/PP Blends, ANTEC, pp. 1914-1919, 1996.

Doroudiani, S. et al., Processing and Characterization of Microcellular Foamed High-Density Polyethylene/Isotactic Polypropylene Blend, Polymer Engineering and Science. 38 (7), pp. 1205-1215, 1998.

Dournel, P. et al., Analysis of the Evolution of PIR Foams in the Context of the Phase Our of HCFCs, Journal of Cellular Plastics, 39, pp. 211-227, 2003.

Dreuth, H. et al., A method for local application of thin organic adhesive films on micropatterned structures, Materials Science and Engineering, C5, pp. 227-231, 1998.

Elkovitch, M. et al., Supercritical Carbon Dioxide Assisted Blending of Polystyrene and Poly(Methyl Methyacrylate), Polymer Engineering and Science. 39(10), pp. 2075-2084, 1999.

Faridi, N. et al., Use of Polyolefin Additives in Inert Gas Extrusion Foaming of Polystyrene, ANTEC, pp. 1987-1990, 2000.

Fletcher, N. et al., Size Effect in Heterogeneous Nucleation, Journal of Chemical Physics, 29(3), pp. 572-576, 1958.

Fu, X. et al., Polymer-clay nanocomposites: exfoliation of organophilic montmorillonite nanolayers in polystyrene, Polymer 42, pp. 807-813, 2001.

Fujimoto, Y. et al., Well-Controlled Biodegradable Nanocomposite Foams: From Microcellular to Nanocellular, Macromol. Rapid Commun., 24, pp. 457-461, 2003.

Gabriel, B. et al., Direct Observation in the Millisecond time Range of Fluorescent Molecule Asymmetrical Interaction with the Electropermeabilized Cell Membrane, Biophysical Society. 73, pp. 2630-2637, 1997.

Gehl, J., Electroporation: theory and methods, perspectives for drug delivery, gene therapy and research, Acta Physiol Scand, 177, pp. 437-447, 2003.

Giannelis, E.P., Polymer Layered Silicate Nanocomposites, Advanced Materials 8(1), pp. 29-35, 1996.

Gilman, J.W., Flammability and thermal stability studies of polymer layered-silicate (clay) nanocomposites, Applied Clay Science 15, pp. 31-49, 1999.

Gilman, J.W. et al., Flammability Properties of Polymer-Layered-Silicate Nanocomposites. Polypropylene and Polystyrene Nanocomposites, Chem. Mater. 12(7), pp. 1866-1873, 2000.

Ginzburg, V.V. et al., Calculating Phase Diagrams of Polymer-Platelet Mixtures Using Density Functional Theory: Implications for Polymer/Clay Composites, Macromolecules 32(17), pp. 5681-5688, 1999.

Ginzburg, V.V. et al., Theoretical Phase Diagrams of Polymer/Clay Composites: The Role of Grafted Organic Modifiers, Macromolecules 33(3), pp. 1089-1099, 2000.

Glasgow, I.K. et al., Design Rules for Polyimide Solvent Bonding, Sensors and Materials 11(5), pp. 269-278, 1999.

Goel, S. et al., Generation of Microcellular Polymeric Foams Using Supercritical Carbon Dioxide. I: Effect of Pressure and Temperature on Nucleation, Polymer Engineering and Science, 34, pp. 1137-1147, 1994.

Gong, X. et al., Surfactant-assisted processing of carbon nanotube/polymer composites, Chemistry of Materials, 12 (4), p. 1049-1052, 2000.

Gordon, J. et al., Genetic transformation of mouse embryis by microinjection of purified DNA, Proc. Natl. Acad. Sci. USA, 78, pp. 6376-6380, 1980.

Gore, M., Adverse effects of gene therapy: gene therapy can cause leukemia: no shock, mild horror but a probe, Gene Therapy, 10(4-4), 1 page, 2003.

Hill, D. et al., Functionalization of carbon nanotubes with polystyrene, Macromolecules, 35(25), pp. 9466-9471, 2002.

Han, C.D. et al., A Study of Foam Extrusion Using a Chemical Blowing Agent, Journal of Applied Polymer Science, 20, pp. 1583-1595, 1976.

Han, J. et al., Bubble Nucleation in Polymeric Liquids. II. Theoretical Considerations, Journal of Polymer Science: Part B: Polymer Physics, 28, 743-761, 1990.

Han, R. et al., Immunization of rabbits with cottontail rabbit papillomavirus E1 and E2 genes: protective immunity induced by gene gun-mediated intracutaneous delivery but not by intramuscular injection, Vaccine, 18, pp. 2937-2944, 2000.

Han X. et al., Extrusion of Polystyrene Microcellular Foam with Supercritical CO2, ANTEC, pp. 1857-1861, 2000.

Han, X. et al., Process Optimization in Microcellular Foam Extrusion, ANTEC, pp. 1741-1745, 2001.

Han, X. et al,. Continuous Microcellular Polystyrene Foam Extrusion with Supercritical CO2, Polymer Engineering and Science. 42(11), pp. 2094-2106, 2002.

Han, X. et al., Influences of Solubility and Viscosity in the Polystyrene/CO2 Microcellular Foaming Extrusion, ANTEC, pp. 1910-1914, 2002.

Han, X. et al., Processing and Cell Structure of Nano-Clay Modified Microcellular Foams, ANTEC, pp. 1915-1919, 2002.

Han, X. et al., Extrusion of Polystyrene Nanocomposite Foams With Supercritical CO2, Polymer Engineering and Science, 43(6), pp. 1261-1275, 2003.

Han, X. et al., Co2 Foaming Based on Polystyrene/Poly(methyl Methacrylate) Blend and Nanoclay, Polymer Engineering and Science, pp. 103-111, 2007.

Huang, X. et al., Synthesis of a PMMA-Layered Silicate Nanocomposite by Suspension Polymerization, Polymer Preprints, (Am. Chem. Soc., Div. Polym. Chem.) 41(1), p. 521, 2000.

Jacobasch, H.J. et al., Wetting of Solids by Liquids With Low and High Viscosity, Progr. Colloid Polym. Sci., 105, pp. 44-54, 1997.

Jin, W. et al., An Investigation on the Microcellular Structure of Polystyrene/LCP Blends Prepared by Using Supercritical Carbon Dioxide, Polymer, 42, pp. 8265-8275, 2001.

Kazarian, S. et al., Specific Intermolecular Interaction of Carbon Dioxide with Polymers, American Chemical Society, 118, p. 1729, 1996.

Kazarian, S. Polymers and Supercritical Fluids: Opportunities for Vibrational Spectroscopy, Macromol. Symp., 184, 215-228, 2002.

Khemani, K.C. et al., Polymeric Foams: An Overview, Science and Technology, ACS Symposium Series, Washington, D.C., 669, pp. 1-7, 1997.

Khine, M. et al. A Single Cell Electroporation Chip, The Royal Society of Chemistry, pp. 38-43, 2005.

Kiran, E. et al., Modeling Polyethylene Solutions in Near and Supercritical Fluids Using the Sanchez-Lacombe Model, The Journal of Supercritical Fluids, 6, pp. 193-203, 1993.

Kiszka, M.B. et al., Modeling High-Pressure Gas-Polymer Mixtures Using the Sanchez-Lacombe Equation of State, Journal of Applied Polymer Science, 36, pp. 583-597, 1988.

Knight, J. et al., Hydrodynamic Focusing on a Silicon Chip: Mixing Nanoliters in Microseconds, 80(17), pp. 3863-3866, 1998.

Kojima, Y. et al., Mechanical properties of nylon 6-clay hybrid, J. Mater. Res. 8(5), pp. 1185-1189, 1993.

Kumar, V. et al., A Process to Produce Microcellular PVC, Intern. Polymer Processing, VIII (1), pp. 73-80, 1993.

Kumar, V. et al., Producion of Microcellular Polycarbonate Using Carbon Dioxide for Bubble Nucleation, Journal of Engineering for Industry, 116, pp. 413-420, 1994.

Krause, B. et al., Ultralow-K Dielectrics Made by Supercritical Foaming of Thin Polymer Films, Advanced Materials, 14(15), pp. 1041-1046, 2002.

Krause, B. et al., Open Nanoporous Morphologies from Polymeric Blends by Carbon Dioxide Foaming, Macromolecules, 35 (5), pp. 1738-1745, 2002.

Krishnamoorti, R. et al., Structure and Dynamics of Polymer-Layered Silicate Nanocomposites, Chem. Mater. 8 (8), pp. 1728-1734, 1996.

Krishnamoorti, R. et al., Rheology of End-Tethered Polymer Layered Silicate Nanocomposites, Macromolecules 30(14), pp. 4097-4102, 1997.

Krishnamoorti, R. et al., Shear response of layered silicate nanocomposites, Journal of Chemical Physics, 114 (11), pp. 4968-4973, 2001.

Kwang, C. et al., Rheology of Molten Polystyrene with Dissolved Supercrticial and Near-Critical Gases, Journal of Polymer Science: Part B: Polymer Physics, 37, pp. 2771-2781, 1999.

Laaksonen, A. et al., Nucleation: Measurements, Theory, and Atmospheric Applications, Annu. Rev. Phys. Chem., 46, pp. 489-524, 1995.

Lan, T. et al., Clay-Reinforced Epoxy Nanocomposites, Chem. Mater. 6(12), pp. 2216-2219, 1994.
Lan, T. et al., On the Nature of Polyimide-Clay Hybrid Composites, Chem. Mater. 6(5), pp. 573-575, 1994.
Lan, T. et al., Mechanism of Clay Tactoid Exfoliation in Epoxy-Clay Nanocomposites, Chem. Mater. 7(11), pp. 2144-2150, 1995.
Lee, D.C. et al., Preparation and Characterization of PMMA-Clay Hybrid Composite by Emulsion Polymerization, Journal of Applied Polymer Science 61, pp. 1117-1122, 1996.
Lee, L.J. et al., Polymer Nanocomposite Foams Prepared by Supercritical Fluid Foaming Technology, 6 pages, unpublished.
Lee, L.J. et al., Design and Fabrication of CD-Like Microfluidic Platforms for Diagnostics: Polymer-Based Microfabrication, Biomedical Microdevices 3:44, pp. 339-351, 2001.
Lee, L.J. et al., Polymer Nanocomposite Foams, Composites Science and Technology, 65, pp. 2344-2363, 2005.
Lee, M. et al., On-Line Measurement of PC/CO2 Solution Viscosities, ANTEC, pp. 1991-1995, 1997.
Lee, M. et al., Measurements and Modeling of PS/Supercrtical CO2 Solution Viscosities, Polymer Engineering and Science, 39(1), pp. 99-109, 1999.
Lee, S., Shear Effects on Thermpoplastic Foam Nucleation, Polymer Engineering and Science, 33(7), pp. 418-422, 1993.
Li, H. et al., Effect of Carbon Dioxide on the Interfacial Tension of Polymer Melts, Ind. Eng. Chem. Res., 43, pp. 509-514, 2004.
Liang, Y. et al., Nano-Effect in In Situ Nylon-6 Nanocomposites, Annual Technical Conference—Society of Plastics Engineers, 59(2), pp. 2218-2220, 2001.
Liao, K. et al., Interfacial characteristics of a carbon nanotube-polystyrene composite system, Applied Physics Letters, 78(25), p. 4225-4227, 2001.
Lin, Y. et al, Simulation and Experimental Demonstration of the Electric Field Assisted Electroporation Microchip for in vitro Gene Delivery Enhancement, Lab Chip, 4, pp. 104-108, 2004.
Liu, C. et al., Foaming of Electron-Beam Irradiated LDPE Blends Containing Recycled Polyethylene Foam, Journal of Polymer Research, 11, pp. 149-159, 2004.
Magauran, E.D. et al., Effective Utilization of Organoclay Dispersants, NLGI Spokesman, pp. 453-460, Mar. 1987.
Marshalli, E., Gene therapy death prompts review of adenovirus vector, 286, pp. 2244-2245, 1999.
Matsuyama, H. et al., Effect of organic solvents on membrane formation by phase separation with supercritical CO2, Journal of Membrane Science, 2004, pp. 81-87, 2002.
Matuana, L.M. et al., Structures and Mechanical Properties of Microcellular Foamed Polyvinyl Chloride, Celluar Polymers 17 (1), pp. 1-16, 1998.
Matuana, L.M. et al., Cell Morphology and Property Relationships of Microcellular Foamed PVC/Wood-Fiber Composites, Polymer Engineering and Science, 38(11), pp. 1862-1872, 1998.
Messersmith, P.B. et al., Synthesis and Characterization of Layered Silicate-Epoxy Nanocomposites, Chem. Mater. 6(10), pp. 1719-1725, 1994.
Messersmith, P.B. et al., Synthesis and Barrier Properties of Poly(ϵ-Caprolactone)-Layered Silicate Nanocomposites, Journal of Polymer Science: Part A: Polymer Chemistry 33, pp. 1047-1057, 1995.
Mir, L. M., et al., Electric Pulse-Mediated Gene Delivery to Various Animal Tissues, Journal of Advanced Genetics, 54, pp. 83-113, 2005.
Mitchell, C. et al., Dispersion of Functionalized carbon nanotubes in polystyrene, Macromolecules, 35(23), pp. 8825-8830, 2002.
Mitsunaga, M. et al., Intercalated Polycarbonate/Clay Nanocomposites: Nanostructure Control and Foam Processing. Macromolecular Materials and Engineering, 288(7), pp. 543-548, 2003.
Naguib, H.E. et al., Effects of Blending of Branched and Linear Polypropylene Materials on the Foamability, ANTEC, pp. 1623-1627, 2001.
Nam, P.H. et al., Foam Processing and Cellular Structure of PP/Clay Nanocomposites, Proceedings of the First World Conference on Nanocomposites, Chicago, IL, 7 pages, 2001.
Nam, P. et al., Foam Processing and cellular Structure of Polypropylene/Clay Nanocomposites, Polymer Engineering and Science, 42(9), pp. 1907-1918, 2002.
Noh, M.W. et al., Synthesis and characterization of PS-clay nanocomposite by emulsion polymerization, Polymer Bulletin 42, pp. 619-626, 1999.
Okada, A. et al., The chemistry of polymer-clay hybrids, Materials Science and Engineering C3, pp. 109-115, 1995.
Okamoto, M. et al., Synthesis and structure of smectic clay/poly(methyl methacrylate) and clay/polystyrene nanocomposites via in situ intercalative polymerization, Polymer 41, pp. 3887-3890, 2000.
Okamoto, M. et al., A House of Cards Structure in Polypropylene/Clay Nanocomposites Under Elongational Flow, Nano Letters, 1(6), pp. 295-298, 2001.
Okamoto, M. et al., Biaxial Flow-Induced Alignment of Silicate Layers in Polypropylene/Clay Nanocomposite Foam, Nano Letters, 1(9), 503-505, 2001.
Olphen, H.V., Clay-Organic Complexes and the Retention of Hydrocarbons by Source Rocks, An Introduction to Clay Colloid Chemistry; John Wiley & Sons: New York, pp. 307-317, 1963.
Park, C. et al., Effect of the Pressure Drop Rate on Cell Nucleation in Continuous Processing of Microcellular Polymers, Polymer Engineering and Science, 35, pp. 432-440, 1995.
Park, C.B. et al., Rapid Polymer/Gas Solution Formation for Continuous Production of Microcellular Plastics, Journal of Manufacturing Science and Engineering, 118, pp. 639-645, 1996.
Park, C.B. et al., The Effect of Talc on Cell Nucleation in Extrusion Foam Processing of Polypropylene with CO2 and Isopentane, Cellular Polymers, 17(4), pp. 221-251, 1998.
Park, C.P., Foam Extrusion of Syndiotactic Polupropylene-Polyethylene Blends, ANTEC, pp. 1650-1654, 2001.
Pecora, R., DNA: A model compound for solution studies of macromolecules, Science, 251(4996), pp. 893-898, 1991.
Perkins, T. et al., Single polymer dynamics in a elongational flow, Science, 276(5321), pp. 2016-2021, 1997.
Pinnavaia, T.J. et al., Clay-Reinforced Epoxy Nanocomposites: Synthesis, Properties, and Mechanism of Formation, ACS Symp. Ser. 622, pp. 250-261, 1996.
Porter, D. et al., Nanocomposite Fire Retardants—A Review, Fire and Materials 24, pp. 45-52, 2000.
Qian, D. et al., Load transfer and deformation mechanisms in carbon nanotube-polystyrene composites, Applied Physics Letters, 76(20), pp. 2868-2870, 2000.
Ramesh, N. et al., The Heterogeneous Nucleation of Microcellular Foams Assisted by the Survival of Microvoides in Polymers Containing Low Glass Transition Particles. Part I: Mathematical Modeling and Numerical Simulation, Polymer Engineering and Science, 34(22), pp. 1685-1697, 1994.
Ramesh, N. et al., The Heterogeneous Nucleation of Microcellular Foams Assisted by the Survival of Microvoides in Polymers Containing Low Glass Transition Particles. Part II: Experimental Results and Discussion, Polymer Engineering and Science, 34(22), pp. 1698-1706, 1994.
Ramesh, N.S., Foam Growth in Polymers, Foam Extrusion: Principles and Practice, S.-T. Editor, Technomic: Lancaster, Basel, pp. 125-144, 2000.
Ray, S.S. et al., New Polylactide/Layered Silicate Nanocomposites, 6a Melt Rheology and Foam Processing, Macromolecular Materials and Engineering, 288(12), pp. 936-944, 2003.
Reichelt, N. et al., PP-Blends with Tailored Foamability and Mechanical Properties, Cellular Polymers, 22(5), pp. 315-326, 2003.
Ren, J. et al., Linear Viscoelasticity of Disordered Polystyrene-Polyisoprene Block Copolymer Based Layered-Silicate Nanocomposites, Macromolecules 33(10), pp. 3739-3746, 2000.
Rodriguez-Perez, M. et al., Effect of Addition of EVA on the Technical Properties of Extruded Foam Profiles of Low-Density Polyethylene/EVA Blends, Journal of Applied Polymer Science, 68, 1237-1244, 1998.
Safadi, B. et al. Multiwalled Carbon Nanotube Polymer Composites: Synthesis and Characterization of Thin Films, Journal of Applied Polymer Science, 84(14), pp. 2660-2669, 2002.
Sandler, J. et al., Development of a Dispersion Process for Carbon Nanotubes in an Epoxy Matrix and the Resulting Electrical Properties, Polymer, 40(21), pp. 5967-5971, 1999.

Sato, Y. et al., Solubilities and Diffusion Coefficients of Carbon Dioxide and Nitrogen in Polypropylene, High-Density Polyethylene, and Polystyrene Under High Pressures and Temperatures, Fluid Phase Equilibria 162, pp. 261-276, 1999.

Schmid, R. et al. Liposome Mediated Gene Transfer into the Rat Oesophagus, Gut, 41, pp. 549-556, 1997.

Seeler, K.A. et al., Tension-Tension Fatigue of Microcellular Polycarbonate: Initial Results, Journal of Reinforced Plastics and Composites, 12, pp. 359-376, 1993.

Shen, J. et al., Nucleation and Reinforcement of Carbon Nanofibers on Polystyrene Nancomposite Foam, unpublished, 5 pages.

Shen, J. et al., Effects of Carbon Nanofibers on Polystyrene Nanocomposites and Foams, ANTEC, pp. 1836-1840, 2004.

Shen, J. et al., Synthesis of Polystyrene-Carbon Nanofibers Nanocomposite Foams, Polymer, 46, pp. 5218-5224, 2005.

Shen, J. et al., Nanoscaled Reinforcement of Polystyrene Foams using Carbon Nanofibers, Journal of Cellular Plastics, 42, pp. 105-126, 2006.

Shi, H. et al., Interfacial Effects on the Reinforcement Properties of Polymer-Organoclay Nanocomposites, Chem. Mater. 8(8), pp. 1584-1587, 1996.

Siripurapu, S., et al., Generation of Microcellular Foams of PVDF and its Blends Using Supercritical Carbon Dioxide in a Continuous Process, Polymer, 43, pp. 5511-5520, 2002.

Siripurapu, S. et al., Low-Temperature, Surface-Mediated Foaming of Polymer Films, Advanced Materials (Weinheim, Germany), 16(12), pp. 989-994, 2004.

Siripurapu, S. et al., Controlled Foaming of Polymer Films Through Restricted Surface Diffusion and the Addition of Nanosilica Particles or CO2-Philic Surfactants, Macromolecules, 38, pp. 2271-2280, 2005.

Slabaugh, Heats of Immersion and Swelling of Organoclay Complexes, 29(3), pp. 586-589, 1969.

Solomon, D.H. et al., Reactions Catalyzed by Minerals. Part I. Polymerization of Styrene, Journal of Applied Polymer Science 9, pp. 1261-1271, 1965.

Solomon, D.H. et al., Reactions Catalyzed by Minerals. Part III. The Mechanism of Spontaneous Interlamellar Polymerizations in Aluminosilicates, Journal of Applied Polymer Science 12, pp. 1253-1262, 1968.

Spitael, C. et al., Block Copolymer Micelles for Nucleation of Microcellular Thermoplastic Foams. Macromolecules, 37(18), pp. 6874-6882, 2004.

Stafford, C.M. et al., Expansion of Polystyrene Using Supercriticial Carbon Dioxide: Effects of Molecular Weight, Polydispersity, and Lower Molecular Weight Components, Macromolecules, 32(22), pp. 7610-7616, 1999.

Strauss, W. et al., Supercritical CO2 Processed Polystyrene Nanocomposite Foams, Journal of Cellular Plastics, 43(3), pp. 229-241, 2004.

Tekle, E., et al., Electroporation by Using Bipolar Oscillating Electric Field: An Improved Method for DNA Transfection of NIH 3T3 Cells, Proc. Natl. Acad. Sci. USA, 88, pp. 4230-4234, 1991.

Tomasko, D. et al., Supercritical Fluid Applications in Polymer Nanocomposites, Current Opinion in Solid State & Materials Science, 7, pp. 407-412, 2003.

Tomasko, D.L. et al., A Review of CO2 Applications in the Processing of Polymers, Ind. Eng. Chem. Res. 42 (25), pp. 6431-6456, 2003.

Usuki, A. et al., Swelling behavior of montmorillonite cation exchanged for ω-amino acids by ε-caprolactam, J. Mater. Res. 8(5), pp. 1174-1178, 1993.

Usuki, A. et al., Synthesis of nylon 6-clay Hybrid, J. Mater. Res. 8(5), pp. 1179-1184, 1993.

Vaia, R.A. et al., Kinetics of Polymer Melt Intercalation, Macromolecules 28(24), pp. 8080-8085, 1995.

Vaia, R.A. et al., Microstructural Evolution of Melt Intercalated Polymer-Organically Modified Layered Silicates Nanocomposites, Chem. Mater. 8(11), pp. 2628-2635, 1996.

Vaia, R.A. et al., Lattice Model of Polymer Melt Intercalation in Organically-Modified Layered Silicates, Macromolecules 30(25), pp. 7990-7999, 1997.

Vaia, R.A. et al., Polymer Melt Intercalation in Organically-Modified Layered Silicates: Model Predictions and Experiment, Macromolecules 30(25), pp. 8000-8009, 1997.

Vaia, R. et al., Polymer Nanocomposites Status and Opportunities, MRS Bull. 26, pp. 394-401, 2001.

Walker, T.A. et al., Multicomponent Polymer Systems in the Presence of Supercriticial Carbon Dioxide, Polymeric Materials: Science and Engineering, 84, pp. 203, 2001.

Wan, C. et al., Extrusion Foaming of PET/PP Blends SPE-ANTEC, 3, pp. 2786-2790, 2001.

Wang, M.S. et al., Clay-Polymer Nanocomposites Formed from Acidic Derivatives of Montmorillonite and an Epoxy Resin, Chem. Mater. 6(4), pp. 468-474, 1994.

Wang, S. et al., Polymeric Nanonozzle Array Fabricated by Sacrificial Template Imprinting, Advanced Materials, 17, pp. 1182-1186, 2005.

Wang, Z. et al., Hybrid Organic-Inorganic Nanocomposites: Exfoliation of Magadiite Nanolayers in an Elastomeric Epoxy Polymer, Chem. Mater. 10(7), pp. 1820-1826, 1998.

Weimer, M.W. et al., Direct Synthesis of Dispersed Nanocomposites by in Situ Living Free Radical Polymerization Using a Silicate-Anchored Initiator, J. Am. Chem. Soc. 121(7), pp. 1615-1616, 1999.

Winter, H. et al., Rigid Pore Structure from Highly Swollen Polymer Gels, Macromolecules, 35(9), pp. 3325-3327, 2002.

Wissinger, R. et al., Swelling and Sorption in Polymer-CO2 Mixtures at Elevated Pressures, Journal of Polymer Science: Part B: Polymer Physics, 25, pp. 2497-2510, 1987.

Yamaguchi, M. et al., Pheological Properties and Foam Processability for Blends of Linear and Crosslinked Polyethylenes, Hournal of Polymer Science: Part B: Polymer Physics, 39, pp. 2159-2167, 2001.

Yang, H.H. et al., The Effect of Nucleating Agents on the Foam Extrusion Characteristics, Journal of Applied Polymer Science, 29, pp. 4465-4470, 1984.

Yano, K. et al., Synthesis and Properties of Polyimide-Clay Hybrid, Journal of Polymer Science: Part A: Polymer Chemistry 31, pp. 2493-2498, 1993.

Zeng, C. et al., Poly(methyl methacrylate) and Polystyrene/Clay Nanocomposites Prepared by in-Situ Polymerization, Macromolecules 34(12), pp. 4098-4103, 2001.

Zeng, C. et al., Polymer Layered Silicate Nanocomposites Prepared by a Two-Stage Method, Annual Technical Conference—Society of Plastics Engineers, 59(2), pp. 2213-2217, 2001.

Zeng, C. et al., Structure of Nanocomposite Foams, ANTEC, pp. 1504-1508, 2002.

Zeng, C. et al., Polymer/Clay Nanocomposite Foams Prepared by CO2, Annual Technical Conference—Society of Plastics Engineers, 61(2), pp. 1635-1639, 2003.

Zeng, C. et al., Polymer-Clay Nanocomposite Foams Prepared Using Carbon Dioxide, Advanced Materials, 15(20), pp. 1743-1747, 2003.

Zeng, C. et al., Dynamic silica assembly for fabrication of nanoscale polymer channels, Materials Letters, 59, 3095-3098, 2005.

Zhang, Y. et al., Morphology and Mechanical Properties of Foamed Polyethylene Blends, Cellular Polymers, 22(4), pp. 211-236, 2003.

Zhou, G. et al., Long Fibers and Nanoparticles Reinforced Epoxy and Phenolic Resins, unpublished, 8 pages.

Zhu, J. et al., Improving the Dispersion and Integration of Single-Walled Carbon Nanotubes in Epoxy Composites through Functionalization, Nano Letters, 3(8), pp. 1107-1113, 2003.

Zhulina, E. et al., Attraction between Surfaces in a Polymer Melt Containing Telechelic Chains: Guidelines for Controlling the Surface Separation in Intercalated Polymer-Clay Composites, Langmuir, 15(11), pp. 3935-3943, 1999.

\* cited by examiner

SUSPENSION POLYMERIZATION AND FOAMING OF WATER CONTAINING ACTIVATED CARBON-NANO/MICROPARTICULATE POLYMER COMPOSITES

CROSS-REFERENCE TO RELATED APPLICATIONS

This application claims the benefit of U.S. Provisional Application No. 61/188,624, filed on Aug. 11, 2008, which is hereby incorporated by reference in its entirety. This application also claims the benefit of PCT Application No. PCT/US09/45511, filed on May 28, 2009, which claims the benefit of U.S. Provisional Application No. 61/130,061, filed on May 28, 2008, each of which is hereby incorporated by reference in its entirety.

STATEMENT REGARDING FEDERALLY SPONSORED RESEARCH OR DEVELOPMENT

The present invention was made with United States Government support under Grant No. OII-0620502 by the National Science Foundation. The United States Government may have certain rights to this invention under 35 U.S.C. §200 et seq.

TECHNICAL FIELD OF THE INVENTION

Exemplary embodiments of the present invention relate to polymeric foams and methods for their production and articles made therefrom.

BACKGROUND AND SUMMARY OF THE INVENTION

With the soaring cost of energy, it is essential to develop new light-weight materials that can provide better thermal insulation performance in housing and construction industries and high structural strength for automotive, aerospace, and electronic applications.

For example, in the housing industry, doubling the 'R' value of current thermal insulation materials can save $200 million annually in heating/cooling costs for families in the U.S. In today's average vehicles, as much as 5-10% in fuel savings can be achieved through a 10% weight reduction. Polymeric foams have been used in many applications because of their excellent strength-to-weight ratio, good thermal insulation and acoustic properties, materials savings, and other factors. By replacing solid plastic with cells, polymeric foams use fewer raw materials and thus reduce the cost and weight for a given volume. The North American market for foamed plastic insulations exceeds $3 billion annually, while global demand is above $13 billion. However, polymer foams, except sandwich composite foams, are rarely used as structural components in the automotive, aerospace, and construction industries because of poor mechanical strength and low dimensional and thermal stability, when compared to bulk polymers.

In recent years, several researchers have reported that foams can possess excellent mechanical strength if the cell size is smaller than the typical flaw size in bulk polymers, i.e., <10 μm. Microcellular foams can reduce material usage and improve mechanical properties simultaneously. They have been commercialized for some applications (i.e., MuCell by Trexel). However, they require specially designed processing equipment, have a narrow process window, and are still not strong enough for structural applications.

Closed-cell plastic foams have better thermal insulation efficiency than glass fiber or plywood insulation materials, but the application of plastic foams in the housing industry is limited due to their poor fire resistance. A drastic reduction of thermal conductivity has been observed when the cell size is reduced to the nanoscale, e.g., aerogel. These nanofoams are currently made of ceramics in thin films and are very expensive. Foams with ultra-low density also provide better thermal insulation. To increase the expansion ratio during foaming in order to achieve ultra-low density, an expensive vacuum system is often needed in the industrial foam extrusion line.

Another critical issue faced by the foam industry is the blowing agent. Traditional chlorofluorocarbon (CFC) and hydrochlorofluorocarbon (HCFC) blowing agents cause ozone depletion and will be banned by 2010 according to the Montreal Protocol. Carbon dioxide ($CO_2$) is an attractive replacement for the ozone-depleting blowing agents because it is low-cost, non-toxic, nonflammable, and not regulated by the Environmental Protection Agency (EPA). Since insulation foams used in houses dramatically reduce energy consumption and thus decrease the pollution generated by power plants, the use of $CO_2$ has both a direct and an indirect benefit to the environment. However, $CO_2$ has a lower solubility in most polymers than traditional blowing agents. It also has a higher diffusivity leading to a quick escape from the foam after processing. While this ensures fast mixing, it also offers a quick escape from the foam after processing resulting in a lower expansion ratio (i.e., higher foam density). The presence of $CO_2$ complicates the manufacturing process and thus results in a high processing cost.

An exemplary embodiment of the present invention seeks to dramatically improve the insulation performance of polymer foams using zero-ozone depleting blowing agents such as, but not limited to, $CO_2$ and/or water. In addition to enhancing the insulation value, which may lower the energy cost of the building, exemplary embodiments of the present invention include developing and manufacturing new truly green polymer insulation foam products.

An exemplary embodiment of the present invention may use at least one blowing agent that has minimal impact on the environment (e.g., zero-ozone depleting blowing agents such as $CO_2$ and/or water). One exemplary embodiment of the present invention relates to polystyrene and/or thermoplastic polymer or polymer blend composite foam or a foamable polymeric material precursor, which contains foaming facilitating material and/or at least one of 1-dimensional, 2-dimensional, and 3-dimensional nano/micro-materials in a polystyrene and/or thermoplastic polymer and/or polymer blend matrix to carry a co-blowing agent such as water without using any surfactant-like molecules and/or polymers, having or adapted to have the properties of low density, high-R value, good mechanical properties, and fire retardance thereof. Exemplary embodiments of the present invention include various manufacturing methods, which are not limited to extrusion, batch molding, and injection molding. One example includes synthesis and $CO_2$ and water-based extruded foaming of such a material. Exemplary embodiments of the present invention also include products made from the materials and/or methods discussed herein.

In addition to the novel features and advantages mentioned above, other benefits will be readily apparent from the following descriptions of the drawings and exemplary embodiments.

BRIEF DESCRIPTION OF THE DRAWINGS

FIG. 4(a) dried beads; FIG. 4(b) 5.2 wt % water; FIG. 4(c) 10.1 wt % water; and FIG. 4(d) 12.3 wt % water. The scale bar is 500 µm.

FIG. 5(a) dried beads; FIG. 5(b) 5.2 wt % water; FIG. 5(c) 10.1 wt % water; and FIG. 5(d) 12.3 wt % water. The scale bar is 200 µm.

FIG. 6(a) PS/1.0% talc; FIG. 6(b) PS/3.0% AC; and FIG. 6(c) water expandable PS/3.0% AC foams. The scale bar is 1 mm.

DETAILED DESCRIPTION OF EXEMPLARY EMBODIMENT(S)

Figure 1:
FIG. 1 shows examples of several SEM micrographs of extrusion foams for comparative purposes: Foaming conditions—$CO_2$ as the blowing agent (200° C.; $CO_2$ pressure=890 Psi; $CO_2$ flow rate=3 g/min; die pressure=1200 psi; screw rotation speed=50 rpm; feeding rate=50 rpm): (a) PS foam (no water); (b) PS/1% AC/0.01% water; (c) PS/1% AC/0.08% water; (d) PS/1% AC/0.36% water; and (e) PS/1% AC/0.54% water.

In accordance with the foregoing summary, the following presents a detailed description of the exemplary embodiments of the present invention, which are presently considered to be the best mode thereof.

An exemplary embodiment of the present invention relates to the synthesis of nanocomposites using particulate-like, plate-like, and fiber-like nanoparticles with, for example, high $CO_2$ and/or water affinity. Polymers or polymer blends including a minor phase with high $CO_2$ solubility may be used as the matrix material. These polymer or polymer blend nanocomposites may then be used to produce high-performance foam products aimed, for example, at both insulation and structural applications. The presence of nanoparticles and polymer blends may allow better control of cell morphology and foam density in the manufacturing process. The low density ($\rho$<0.04 g/cm3) foams with better thermal insulation, fire resistance, and mechanical strength may be particularly useful for thermal insulation applications, while the high-density ($\rho$>0.5 g/cm3) nanocomposite foams and sandwich foams with a similar mechanical strength as solid polymers may be particularly useful for structural insulation applications. Successful implementation of this novel technology may lead to significant energy savings, material savings, and enhanced environmental protection, all of which are critical to the economy and societal health.

One exemplary embodiment of the present invention relates to synthesis and $CO_2$-based extrusion foaming of polystyrene (PS) and/or other thermoplastic polymers or polymer blends, which contain activated carbon and/or at least one of 1-dimensional, 2-dimensional, and 3-dimensional nano/micro-materials in the polymer matrix. The proposed process includes a co-blowing agent such as water (which may be used alone as the blowing agent in some examples) without using any surfactant-like molecules and/or polymers, to produce a material with low density, high-R value, bimodal structures, good mechanical properties, and fire retardance thereof.

As used herein, "surfactant-like molecules and/or polymers" refers to molecules and/or polymers that are used to mediate the admixture or dissolution of water into base polymers such as those used in accordance with an exemplary embodiment of the present invention. Some commonly encountered surfactants of each type include: ionic surfactants such as anionic surfactants (typically based on sulfate, sulfonate, or carboxylate anions), bis(2-ethylhexyl) sulfosuccinate, sodium salt, sodium dodecyl sulfate (SDS), ammonium lauryl sulfate, and other alkyl sulfate salts, sodium laureth sulfate, also known as sodium lauryl ether sulfate (SLES), alkyl benzene sulfonate, soaps, and fatty acid salts; cationic surfactants (typically based on quaternary ammonium cations) such as, but not limited to, cetyl trimethylammonium bromide (CTAB), a.k.a. hexadecyl trimethyl ammonium bromide, and other alkyltrimethylammonium salts, cetylpyridinium chloride (CPC), polyethoxylated tallow amine (POEA), benzalkonium chloride (BAC), benzethonium chloride (BZT), zwitterionic (amphoteric), dodecyl betaine, dodecyl dimethylamine oxide, cocamidopropyl betaine, and coco ampho glycinate; and nonionic surfactants such as, but not limited to, alkyl poly(ethylene oxide), copolymers of poly(ethylene oxide) and poly(propylene oxide) (commercially called poloxamers or poloxamines), and alkyl polyglucosides, including, but not limited to, octyl glucoside, decyl maltoside, fatty alcohols, cetyl alcohol, oleyl alcohol, cocamide MEA, and cocamide DEA.

Typical values for high R-value extruded polystyrene foam are R=5.4 per inch thickness or higher. For low density, the presence of activated carbon may lead to higher water content in the pellets or beads and reduced the water loss during storage and foaming. The presence of water cavities may significantly enlarge the cell size and lead to a foam product with ultra-low density (~0.03 g/cc) and low thermal conductivity.

Polymeric foams are widely used in certain applications such as insulation, cushions, absorbents, and scaffolds for cell attachment and growth. Polystyrene (PS) foams are the second largest volume use among different foam materials. The extrusion and batch foaming processes are the two major techniques to produce PS foams. For extrusion foaming, hydrogen-containing chlorofluorocarbons (HCFC) and fluorocarbons (HFC) are currently used as blowing agents in the foam industry. Recently, supercritical $CO_2$ is an alternative choice because of its low cost, non-toxic, and non-flammable properties, and relatively high solubility in many polymers.

In the batch foaming process, expandable PS (EPS) is generally prepared by the modified styrene suspension polymerization method. In general, an organic blowing agent such as pentane is used during polymerization. When heating the pentane-containing PS beads up to their glass transition temperature, PS foams are obtained. Flammable blowing agents, e.g., pentane, hexane, etc., however, are not suitable for continuous extrusion foam processing due to safety concerns. Thus, the concept of water expandable polystyrene (WEPS) was proposed. Crevecoeur et al. reported a two-step synthesis method, i.e., inverse emulsion and water suspension, to entrap water in the PS matrix. Pallay et al. used starch as a water absorbent to replace the emulsifier in the inverse emulsion.

After suspension polymerization, water was directly absorbed into the starch inclusions. This method requires surfactants to stabilize water, which is unfavorable for fire resistance properties.

Until now, it is difficult to produce ultra-low density foams by extrusion using only $CO_2$ as the blowing agent because of the low solubility and high diffusivity of $CO_2$ in polymers. Thus, it is necessary to introduce a co-blowing agent such as water in the $CO_2$ foaming process. Although previous studies have demonstrated that it is possible to obtain PS foams with ultra-low density (~0.03 g/cc) for WEPS and water expandable polystyrene-clay nanocomposites (WEPSCN), the work was mainly based on the batch foaming process and surfactants are also needed to trap water as a co-blowing agent.

In an exemplary embodiment of the present invention, an extrusion foaming process involves using suspension polymerization to directly entrap a co-blowing agent such as water into polymer-activated carbon nanocomposites without adding a surfactant as the stabilizer. Instead, examples of a suspension stabilizer for use in exemplary embodiments of the invention include hydroxyethyl cellulose (HEC), polyvinyl alcohol (PVA), and mixtures thereof.

For thermal insulation applications, the thermal insulation efficiency is dependent on the average cell size of the foams, the polymer used, and the blowing agent used. It is known that extruded polystyrene foam blown by CFC has a higher thermal insulation value than that previously blown by $CO_2$, resulting from the low thermal conductivity of CFC. Foams containing infrared attenuating agents also could enhance the thermal insulation value. However, such addition of infrared attenuating agent will reduce the cell size and increase the bulk density.

An exemplary embodiment of the present invention may produce PS (or other polymer) nanocomposite foams with a lower bulk density and better infrared (IR) absorption than conventional PS/Talc foams under the same extrusion conditions without using any inverse emulsion surfactant. These attributes may enhance thermal insulation efficiency.

To achieve this goal, water may be introduced as a co-blowing agent with $CO_2$ to control the bulk density, bubble size, and expansion ratio in the extrusion process. PS and most other polymers are hydrophobic, and will not absorb any water. Thus, a carrier may be used to carry water into the extruder. This carrier preferably does not reduce the bubble size or increase the bulk density of the foam. Activated carbon (AC) is a good absorbent for liquids and gases with high thermal stability. Therefore, an exemplary embodiment of the present invention may feature the use of activated carbon as a water carrier. The results described below elucidate its effect in the PS foaming process.

Preliminary results showed that there are no significant differences in the properties of PS/AC foams blown by $CO_2$ with/without the presence of water (see FIG. 1).

Figure 2:
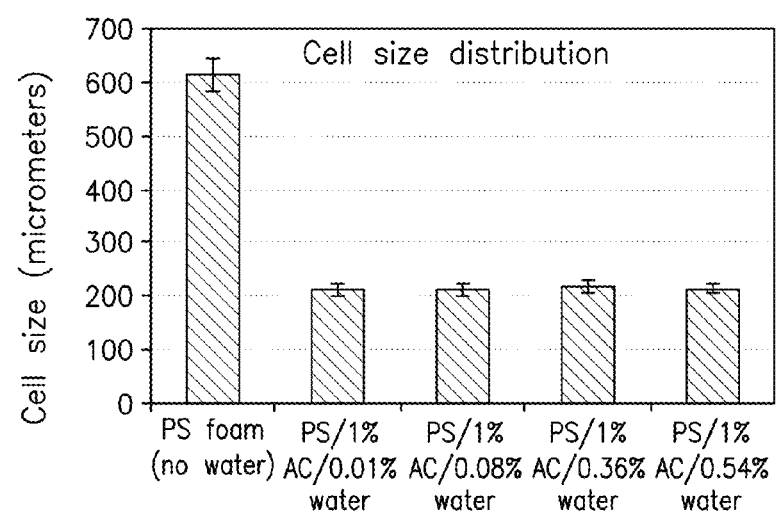
FIG. 2 is a graph of cell size distribution of PS and PS/AC foams blown by $CO_2$ and water, in accordance with embodiments of the present invention.

It was also observed that the average bubble sizes of PS/AC foams are 3 times smaller than that of PS foams (FIG. 2). Activated carbon has a higher $CO_2$ affinity than pure PS and more nucleation centers are generated by activated carbon in the PS matrix. Although not limited to the theory upon which the invention operates, it is believed that this may explain why the cell size decreases when activated carbon is present in the foaming process. The cell size, however, may be similar to that of the PS/$TiO_2$ foams and much larger than that of PS/nanoclay foams. For thermal insulation foams, this is a positive result. However, the water absorbed by AC did not show any significant effect on the cell size in the extrusion process (FIG. 2). Again though theory does not limit an exemplary embodiment of the present invention, it is believed that the water evaporated in the first zone of the extruder and then escaped from the feeding hopper due to the high operation temperature, ~200° C., in the extruder.

Figure 3:
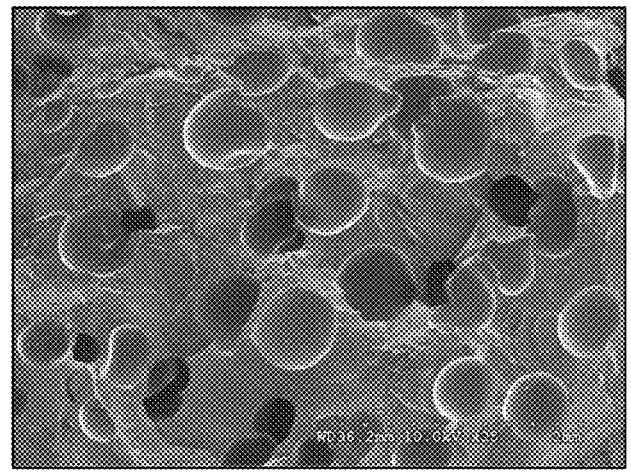
FIG. 3 shows a single SEM micrograph of extrusion foam in accordance with one embodiment of the present invention.
Figure 4A:
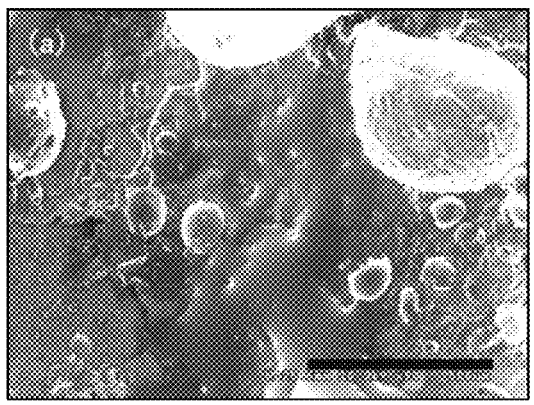
FIGS. 4(a) through 4(d) show examples of SEM micrographs of foam morphologies of water expandable PS/3.0% AC foams with different water contents in oil bath at 135° C. for 15 seconds.
Figure 4B:
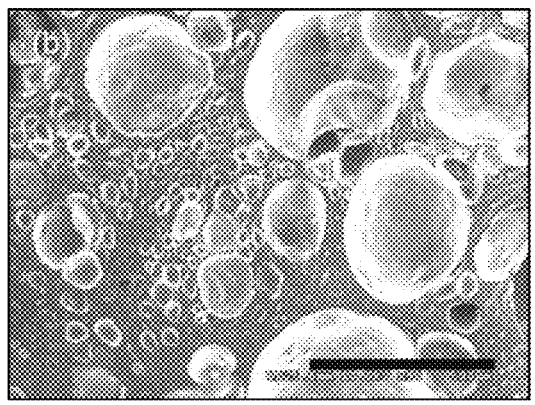
Figure 4C:
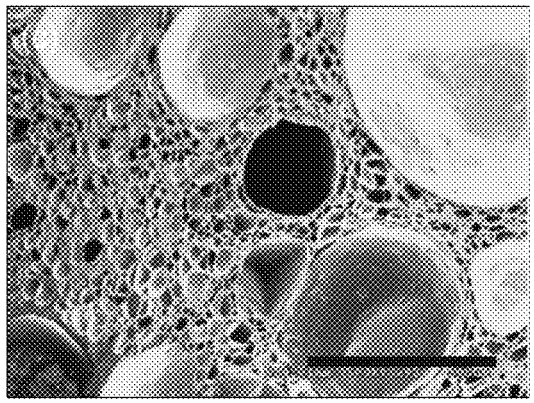
Figure 4D:
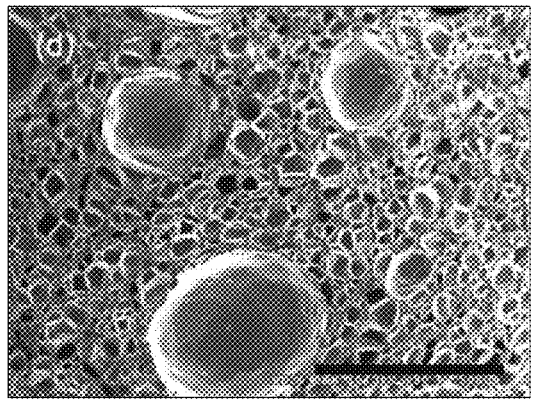
Figure 5A:
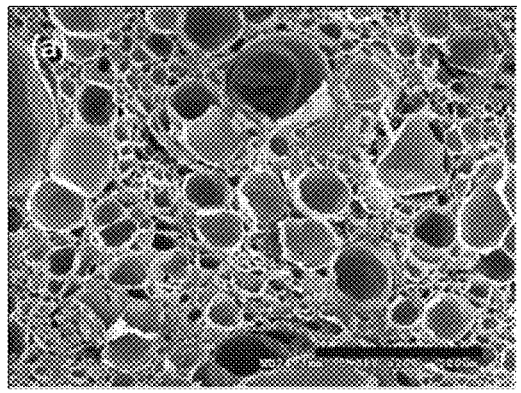
FIGS. 5(a) through 5(d) show examples of foam morphologies of water expandable PS/3.0% AC foams with different water contents expanded by using the combination of water and $CO_2$ as blowing agents in oil bath at 135° C. for 15 seconds.
Figure 5B:
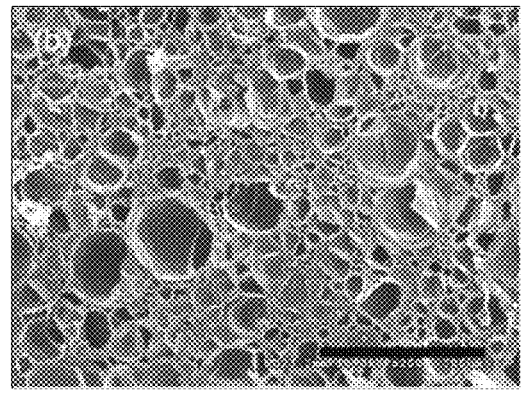
Figure 5C:
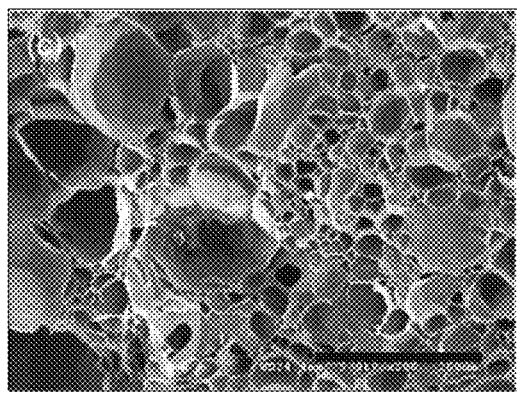
Figure 5D:
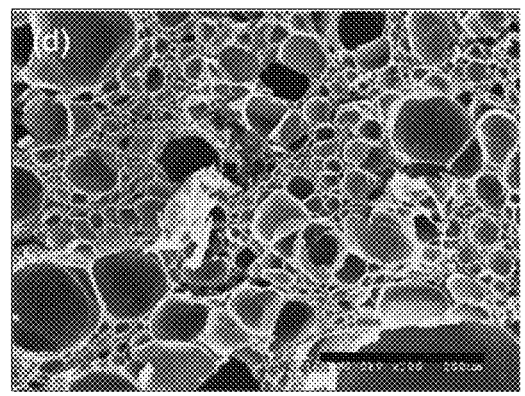

PS/AC/water samples from different zones in the extruder were examined, and it was found that the water content was very low in the extracted samples. For example, when 1.33% w/w of water in PS with 1.0% AC was loaded into the extruder, the sample extracted from the middle zone showed only 0.012% w/w of water remaining in the PS/0.03% AC. Most of the water (~70% by wt) evaporated due to the high temperature but some voids resulting from the 30% wt of remaining water could be observed in the extracted samples (FIG. 3).

The macro/meso/micropores in an AC matrix may become an excellent reservoir for liquids such as water, ethanol, hexane, etc. These liquids may act as a co-blowing agent to assist PS composite foaming. This novel water encapsulation technique is intended to overcome the problem arising from water evaporation in the extrusion process.

In an exemplary embodiment, the liquid media may diffuse into the pores of the activated carbon when the Styrene/PS/AC composite is suspended and then polymerized in water. Examples of suspension liquids include chemical agents that evaporate, decompose, or react under the influence of heat to form a gas, ranging from hydrocarbons (e.g., butane, pentane, hexane, cyclohexane, petroleum ether, natural gases, etc.), halogenated hydrocarbons (e.g., methylene chloride, dioctyl phthalate, etc.), alcohols (e.g., methanol, ethanol, isoproponal, etc.), dihydric alcohol, polyhydric alcohol, ketones, esters, ethers, amides, acids, aldehydes, water, or mixtures thereof.

In an exemplary embodiment, the suspension polymerization may be completed under pressure (e.g., typically at or above atmospheric to about 2000 psi or higher, preferably 100 psi) and at a temperature below or above Tg of the base polymer (typically more than 20 degrees above Tg). These conditions are maintained for a period of time sufficient to substantially or totally consume the styrene monomer. The pellets, upon cooling to room temperature and returning to atmospheric pressure, may be further handled for extrusion processing, batch forming processing, or injection molding.

An exemplary process of the present invention may be carried out with any primary blowing agent, such as $CO_2$ or $N_2$ or hydrofluorocarbon or fluorocarbon or mixtures thereof. Fluorocarbon and hydrofluorocarbon may include such substances as CFC11, HCFC 123, or HCFC 141b. In exemplary embodiments of the invention, an environmentally friendly blowing agent is preferred as previously noted.

The blowing agent(s) may also be any liquid(s) that evaporate, decompose, or react under the influence of heat to form a gas, and activated carbon, for example, may be used as a carrier to carry these blowing liquids into foamable polymers. Water is a preferred liquid for some exemplary embodiments of the invention. As previously mentioned, these liquid blowing agents include chemical agents that evaporate, decompose, or react under the influence of heat to form a gas, ranging from, but not limited to, hydrocarbons (e.g., butane, pentane, hexane, cyclohexane, petroleum ether, natural gases, etc.), halogenated hydrocarbons (e.g., methylene chloride, dioctyl phthalate, etc.), alcohols (e.g., methanol, ethanol, isoproponal, etc.), dihydric alcohol, polyhydric alcohol, ketones, esters, ethers, amides, acids, aldehydes, water, or mixtures thereof.

In studies, high-pressure reaction chambers at the controlled temperature, 100~130° C., were used to conduct post-cure experiments involving the methods and compositions of exemplary embodiments of the present invention. The preliminary results are very promising. In examples, water was entrapped into the polymer composite matrix and may survive extrusion foam processing.

The methods and compositions of exemplary embodiments of the present invention may use any polystyrene and other polymer composites which contain, for example, activated carbon and/or at least one of 1-dimensional (e.g, smectite clays (organoclays) or nanographites (graphite, graphene, and graphene oxide)), 2-dimensional (e.g., carbon nanofibers, multiwall carbon nanotubes, single wall carbon nanotubes, conducting polymer nanofibers/nanotubes, polymer nanofibers/nanotubes, etc.), and 3-dimensional (e.g, quantum dots, polyoctahedralsilasesquioxanes (FOSS), silica, $TiO_2$, ZnO or $Fe_3O4$ nanoparticles, soybean hulls and other natural materials, etc.), nano/micro-materials in the polymer matrix to carry water without using any surfactant-like molecules and/or polymers. Low density material with high-R value, a bimodal structure, good mechanical properties, and high fire retardance may be produced.

The polymers used in accordance with exemplary embodiments of the present invention may be macromolecules that include polystyrene, polystyrene/PMMA blends, polystyrene/PPO blends, polystyrene/high-impact polystyrene (HIPS) blends, and mixtures of any of the foregoing.

Foamed Polymer Method—Water and Blowing Agent

Generally, one example of the method of the present invention may be summarized as a method of making an extruded foamed polymer comprising: (a) preparing a foamable polymeric material precursor comprising: (1) suspension polymerization of a mixture comprising (i) styrene monomer; (ii) a polymeric material selected from the group consisting of polystyrene, thermoplastic polymers, and polymer blends thereof; (iii) a foaming facilitating material having water or other blowing agent affinity comprising activated carbon, charcoal (especially bamboo charcoal), and/or selected additional material selected from the group consisting of activated carbon, charcoal (especially bamboo charcoal), 1-dimensional, 2-dimensional, and 3-dimensional nano/micro-materials and mixtures of two or more thereof; and (iv) the foaming facilitating material adapted to absorb water in the absence of any surfactant-like molecules or polymers before mixing with styrene (or other monomers) and/or polystyrene (or other polymer) mixtures and suspension polymerization; and (2) a blowing agent; and (b) preparing a foamed polymer from the foamable polymeric material precursor.

One may use known processing techniques for formulating and extruding the foamable polymeric material precursor.

In an exemplary embodiment, it may be preferred that the polymeric material is polystyrene, but it may include any thermoplastic materials such as those set forth herein.

It may also be preferred that the polymeric material in an exemplary embodiment is polystyrene and that the foaming facilitating material comprises activated carbon.

Preferred amounts of the foaming facilitating material and the polymeric material may be in relative amounts in a weight ratio in the range of 20% to 0.01% in exemplary embodiments of the invention.

The 1-dimensional, 2-dimensional, and 3-dimensional nano/micro-material may be selected from any material capable of containing small amounts of water, such as those as those set forth herein.

In an exemplary embodiment of the present invention, bamboo charcoal is another excellent water affinity material that may be used together with or in place of the activated carbon. Similar to activated carbon, bamboo charcoal is a highly porous carbon based material with very high water absorption characteristics.

Where an additional blowing agent besides water is provided (as the method may be carried out with water alone), the blowing agent may be any agent (liquid or gas) effective to provide a foaming action, such as those set forth herein. Preferably, the blowing agent comprises $CO_2$. It is also possible that an example of the method of the present invention may be carried out with a blowing agent alone.

An exemplary embodiment of the present invention includes products made in accordance with any of the variations of the methods disclosed herein.

One exemplary embodiment of the present invention thus produces $CO_2$-containing polymer nanocomposite foams with both mechanical and thermal insulation properties superior to foams produced with either hydrochlorofluorocarbon (HCFC) or hydrofluorocarbon (HFC) blowing agents.

The replacement of the ozone-depleting substances in an exemplary embodiment of the present invention may allow one to retain the insulating R-value and decrease manufacturing costs. The replacement in this exemplary embodiment of the present invention is legally mandated and, in general, maintains the insulating R-value and decreases manufacturing costs.

An exemplary embodiment of the present invention also permits the use of up to 100% recycled plastics, e.g., recycled expanded polystyrene (EPS). Such material may not be biodegradable and are typically taken to a landfill, contributing to environmental issues.

An exemplary embodiment of the present invention provides light-weight and low-cost microcellular, nanocomposite materials with tunable thermal and mechanical properties. These nanocomposite foams may save not only raw materials derived from petrochemicals but also energy consumption through the product's life time.

The technical approach for surmounting the challenges associated with the use of nanomaterials and $CO_2$ as a blowing agent is described below.

Nanoparticle Material Innovations: Polymer nanocomposites have demonstrated impressive improvements in mechanical strength without losing toughness/impact strength. A recent study by NIST and several research groups showed that adding nanoclay to polymers can address fire prevention issues.

Recent work has shown that the different distribution morphology of nano-montmorillonite (MMT) clay particles in polystyrene rigid foams (clay layers become exfoliated, intercalated, or agglomerated) greatly changes the cell density, cell size and orientation, and other cell morphology characteristics.

However, it has also been found that the modifiers currently used in preparing the commercial nanoclay precursor present a fire hazard.

The nanoclay/polystyrene composite foams suffer from a very high ignitability (low oxygen index) due to the presence of a high amount of organic surface modifiers. To achieve truly fire resistant advantages, an exemplary embodiment of the present invention provides for fire retardant modifiers, low modifier content nanoparticles, and/or a special treatment to eliminate the modifier during compounding.

Exemplary embodiments of the present invention may also provide for the development of multi-functional nano-carbon materials including layered graphite, nanoporous activated carbon, carbon nanofibers (CNF), and multi-wall carbon nanotubes (MWCNT), which may not only work as a cell morphology control agent and a gas diffusing barrier, but also as an infrared attenuation agent and a carrier for benign co-blowing agents such as water to enhance the insulation R-value.

Blowing Agent Innovations: The use of traditional chlorofluoromethane blowing agents has been prohibited globally because of their high ozone depletion effect. Among the potential replacements, $CO_2$ is the most favorable, because it is nontoxic and environmentally benign (zero Ozone Depletion Potential, and 100 year Globe Warming Potential only one in comparison with 1300 for HFC-134a, and 2000 for HCFC-142b), and it is inexpensive.

Companies such as Dow Chemical and Owens Corning are very active in research and development related to the use of $CO_2$ as the future blowing agent. For example, Dow has been granted patents (U.S. Pat. Nos. 5,250,577, 5,266,605 and 5,389,694, hereby incorporated herein by reference) for $CO_2$-containing polystyrene foams and Owens Corning has been granted patents (WO 00/15701 and U.S. Pat. No. 6,268,046, hereby incorporated herein by reference) for a process for producing extruded polystyrene with $CO_2$ as a blowing agent. However, the $CO_2$-containing foam products developed to date are intended primarily for use in the packaging market, for which thermal insulation properties and structural strength are not as critical as in the building insulation market.

Thus, an exemplary embodiment of the present invention provides a method of producing $CO_2$-containing polymer foam that has both tunable thermal insulation property and mechanical strength in comparison with existing polymer foam board.

The primary three issues regarding $CO_2$ that may be addressed by an exemplary embodiment of the present invention thus are: (1) the low solubility of $CO_2$ in polymer melts. (The solubility of $CO_2$ in polystyrene is only about 3.5% at elevated temperature and pressure, at 150° C. and 10 Mpa. However, a solubility of about 5 to 6% is required to achieve the necessary cell growth); and (2) $CO_2$ has a high diffusivity in the polymer melt due to its small size. While this ensures a fast mixing process, it also offers a quick escape from the foam after processing. Compared with HCFC's, $CO_2$ has a much greater nucleation ability, which means that nuclei may be created without the aid of nucleation agents; and (3) higher gas thermal conductivity in comparison with that of HFC blowing agents. The challenges of developing $CO_2$ as a foaming agent arise therefore from solubility limitations, high-pressure operation, high thermal conductivity, and rapid gas escape after the foaming process.

An exemplary embodiment of the present invention may provide several alternatives: (1) modifying the structure or composition of the polymer and polymer blends to increase intermolecular interactions with $CO_2$; and (2) adding nanoparticles that have a high affinity for $CO_2$.

The surfactant commonly introduced onto the particle surface to achieve good compatibility between the inorganic nanoparticles and the organic polymer or monomer to achieve good particle dispersion is usually a flammable material.

Using activated carbon to carry nanoclay-water into the polymer matrix may therefore achieve surfactant-free composites with good clay dispersion. In examples, incorporation of a very small amount of nanoclay (typically no more than 0.5% by weight) substantially increased the expansion ratio of PS composites.

Using $CO_2$ as the co-blowing agent in studies, the resultant PS foams exhibited lower bulk density and a cell structure better than the current insulation foams. Together with the lower bulk density, the activated carbon PS foam may be superior to the PS or WEPS foams for thermal insulation applications. $CO_2$-assisted extrusion foaming of water-containing activated carbon-PS foam beads can reach a bulk density of 0.032 g/cc with a thermal conductivity of 20 mW/mK.

Materials produced in accordance with an exemplary embodiment of the present invention may therefore eliminate the need of an expensive vacuum system, and one can realize the complete replacement of HCFC and HFC by $CO_2$ if desired.

The foamable mixtures of an exemplary embodiment of the present invention may be extruded and foamed into foam products, such as foam board, foam sheet, and other foam structures, which are also exemplary embodiments of the present invention.

EXAMPLE 1

53 g of polystyrene, 0.25 g of AIBN, 0.15 g of BPO, and 3 g of activated carbon containing 7.5 g of water were mixed with 47 g of styrene. The mixture was kept overnight at room temperature. The viscous solution (around 100 g) was suspended in water (300 g) with the aid of suspension stabilizers, hydroxyethyl cellulose (HEC) (0.6 wt % based on the suspension water) and PVA (0.005 wt % based on suspension water), at 80° C. at a high stirring rate (800 rpm). During the polymerization, the stirring rate and temperature were kept at 600 rpm and 90° C. respectively. After approximately 5 hours, the suspension was transferred to an autoclave and post-cured at 120° C. under 100 psi for 12 hours to achieve complete reaction. Finally, the suspension was cooled to room temperature. The spherical black beads were washed and stored in water. Water on the surface of PS/AC beads was removed before extrusion.

EXAMPLE 2

53 g of polystyrene, 0.25 g of AIBN, 0.15 g of BPO, 3 g of nanoclays, and 3 g of activated carbon containing 7.5 g of water were mixed with 47 g of styrene. The mixture was kept overnight at room temperature. The viscous solution (around 100 g) was suspended in water (300 g) with the aid of suspension stabilizers, HEC (0.6 wt % based on the suspension water) and PVA (0.005 wt % based on suspension water), at 80° C. at a high stirring rate (800 rpm). During the polymerization, the stirring rate and temperature were kept at 600 rpm and 90° C. respectively. After approximately 5 hours, the suspension was transferred to an autoclave and post-cured at 120° C. under 100 psi for 12 hours to achieve complete reaction. Finally, the suspension was cooled to room temperature. The spherical black beads were washed and stored in water. Water on the surface of PS/AC beads was removed before extrusion.

EXAMPLE 3

53 g of polystyrene, 0.25 g of AIBN, 0.15 g of BPO, 3 g of carbon nanofibers, and 3 g of activated carbon containing 7.5 g of water were mixed with 47 g of styrene. The mixture was kept overnight at room temperature. The viscous solution (around 100 g) was suspended in water (300 g) with the aid of suspension stabilizers, HEC (0.6 wt % based on the suspension water) and PVA (0.005 wt % based on suspension water), at 80° C. at a high stirring rate (800 rpm). During the polymerization, the stirring rate and temperature were kept at 600 rpm and 90° C. respectively. After ~5 h, the suspension was transferred to an autoclave and post-cured at 120° C. under 100 psi for 12 h to achieve complete reaction. Finally, the suspension was cooled to room temperature. The spherical black beads were washed and stored in water. Water on the surface of PS/AC beads was removed before extrusion.

EXAMPLE 4

A mixture comprised of 97 g of styrene, 3 g of activated carbon, with 0.25 g of AIBN (initiator) and 0.25 g of BPO, was polymerized at 120° C. at a high stirring rate (800 rpm) for 12 hours. The mixture was suspended in water (300 g) with the aid of suspensions, HEC (0.6 wt % based on the suspension water) and PVA (0.005 wt % based on suspension water), at 80° C. at a high stirring rate (800 rpm). During the polymerization, the stirring rate and temperature were kept at 600 rpm and 90° C. respectively. After ~5 h, the suspension was transferred to an autoclave and post-cured at 120° C. under 100 psi for 12 h to achieve complete reaction. Finally, the suspension was cooled to room temperature. The spherical black beads were washed and stored in water. Water on the surface of PS/AC beads was removed before extrusion.

EXAMPLE 5

In examples 1-4, the foaming method may be extrusion foaming or batch foaming or injection molding foaming. The primary blowing agent may be $CO_2$ or $N_2$ or hydrofluorocarbon or fluorocarbon or mixtures thereof. Fluorocarbon and hydrofluorocarbon include CFC11, HCFC 123, or HCFC 141b, etc.

EXAMPLE 6

In this example, water acts as a co-blowing agent to support carbon dioxide ($CO_2$) in the extrusion foaming process of polystyrene (PS) to produce foams with very low density for thermal insulation applications. Herein, we report a simple suspension polymerization method to prepare water expandable polystyrene (W EPS) based on a PS-water containing activated carbon (AC) composite. AC pre-saturated with water was introduced into the styrene monomer to form a water-in-oil inverse emulsion without emulsifiers. Via suspension polymerization, water expandable PS-AC (WEPSAC) beads could be subsequently obtained. Low density PS foams (~0.03 g/cc) were successfully produced in the $CO_2$ extrusion foaming process using WEPSAC. Because of lower foam density and better IR absorption due to the presence of water containing AC, WEPSAC foams provided a lower thermal conductivity than conventional talc reinforced PS foams.

Polymeric foams are widely used in applications such as insulation, cushions, absorbents, and scaffolds for cell attachment and growth [4-6]. Polystyrene (PS) is one of the major foam materials in the market [7, 8]. Currently, hydrogen-containing chlorofluorocarbons (HCFCs) and fluorocarbons (HFCs) are the main blowing agents for PS foaming. However, HCFCs and HFCs have to be replaced soon due to the ozone-depletion and global warming problems. Among various alternative blow agents, carbon dioxide ($CO_2$) is the most promising material because it is nonflammable, inexpensive, environmentally benign, and has relatively high solubility than other inert gases in many polymers [9, 10]. However, the low solubility and high diffusivity of $CO_2$ in polymers make it difficult to produce low density foams necessary for thermal insulation applications.

Water has been used as a co-blowing agent in the batch polymer foaming process for many years. Water expandable polystyrene (WEPS) is a good example. WEPS is generally synthesized by preparing a water-in-oil mixture for styrene suspension polymerization. The first method to produce WEPS was developed by Crevecoeur et al [1]. In that method, water was emulsified in a pre-polymerized styrene/PS mixture in the presence of emulsifiers. Subsequently, the inverse emulsion was suspended in a water medium containing suspension agents. Polymerization was continued until complete conversion. The final products are spherical PS beads with entrapped micrometer-scaled water droplets. The second method was developed by Pallay et al [2]. Instead of using emulsifiers, starch was used as a water-swellable phase. Pre-polymerization of the styrene/starch mixture was carried out to a conversion of approximately 30%. The viscous reaction phase was subsequently transferred to a water medium containing suitable suspension agents. In the last step, polymerization was completed and water was directly absorbed into the starch inclusions.

We recently reported a modified route of suspension polymerization to prepare water expandable polystyrene-clay nanocomposites (WEPSCN) [11]. The presence of nanoclay in the water-in-oil emulsion reduced the amount of emulsifiers used and enhanced the water stability in the PS beads. Although low density (~0.03 g/cc) foams were obtained by using WEPSCN in the $CO_2$ batch foaming process, it is difficult to use WEPS or WEPSCN in the extrusion foaming process because water tends to evaporate away in the early portion of the extruder when the WEPS or WEPSCN pellets are crushed and melted by the rotating screw in the heated barrel. A better water carrying material or process is needed to solve this problem in the extrusion foaming process.

Activated carbon (AC) has an exceptionally high surface area which makes it an excellent water-absorbent. Previously, our group has studied the effect of moisture content in the extrusion foaming process by adding activated carbon particles containing different amounts of water together with PS into a twin screw extruder. However, most of the water was evaporated by the heat generated from the extruder and only a slight decrease in foam density was observed [3]. In this study, AC pre-saturated with water was introduced into a styrene/PS solution. The viscous mixture was subsequently transferred to a water medium containing suspension agents. Via suspension polymerization, PS beads containing AC/water droplets were obtained. Applying these beads into the extrusion foaming process with $CO_2$ as a blowing agent, more water could be trapped. The extruded foams were characterized for cell morphology, IR transmission, and thermal conductivity.

Materials

PS (CX5197; $M_n$=86,000) from Total Petrochemicals (formerly Nova) was used as received. Foaming agent $CO_2$ (>99.9%) was provided by Praxair. Wood based activated carbon (AC) particles with diameters of 38 μm were provided by MeadWestvaco Corp. Styrene was purchased from Aldrich and distilled before use. The initiators, 2,2'-azobis(isobutyronitrile) (AIBN) and dibenzoyl peroxide e(BPO) with a half-life ($t_{1/2}$) at 90° C. of 25 and 145 min, respectively, were purchased from Aldrich. The suspension stabilizers, hydroxyethyl cellulose (HEC, $M_w$=250,000) and polyvinyl alcohol (PVA), were supplied by Aldrich and used as received.

Suspension Polymerization 53 g PS, 0.25 g AIBN, 0.15 g BPO, and 3 g AC absorbed 7.5 g water were mixed with 47 g styrene and the mixture was kept overnight at room temperature. Approximately 100 grams of viscous solution was suspended in 300 grams of water with the aid of suspension stabilizers, HEC (0.6 wt % based on the suspension water) and PVA (0.005 wt % based on suspension water), at 80° C. and a high stirring rate of 800 rpm. During the polymerization, the stirring rate and temperature were kept at 600 rpm and 90° C., respectively. After about 5 hours, the suspension was transferred to an autoclave and post-cured at 120° C. and 0.69 MPa (100 psi) in a nitrogen atmosphere for 12 hours to achieve complete conversion. Finally, the suspension was cooled to room temperature and the final products, WEPSAC pellets, were collected by filtration.

Expansion of WEPSAC Beads

After the suspension polymerization, the moisture content of the beads was determined by drying them in an oven. The average water content was found to be around 13.0%. To control the water content, the beads were dried at 70° C. in a vacuum oven for a specific duration of time. The beads with different moisture contents were expanded in an oil bath at 135° C. for 30 seconds. After that, the expanded beads were quenched by an ice-water mixture.

Batch Foaming of WEPSAC by $CO_2$

In this study, a two-step batch foaming process was employed. The beads were first saturated with $CO_2$ at 25° C. under a pressure of 13.8 MPa (2002 psi) for 24 hours to reach the equilibrium. After that, the pressure was quickly released and the beads were removed from the high-pressure chamber. The beads were subsequently immersed into an oil bath at a temperature of 135° C. for 15 seconds. The expanded beads were quenched in an ice-water mixture.

Extrusion Foaming

Extrusion foaming was carried out by pumping the blowing agent ($CO_2$) into a twin screw extruder (Leistritz ZSE-27; L/D=40; D=27 mm) using a gas/liquid injection port. For the PS/3.0 wt % AC sample without water, PS containing 5.0 wt % AC was pre-compounded with pure PS to dilute the AC content to 3.0t % via extrusion. For WEPSAC samples, the pre-dried PS beads were directly fed into the hopper by a volumetric feeder. The extruder was outfitted with a slit die, a shaping die, and rollers for foam uptake. During the extrusion foaming process, the screw speeds of the feeder and extruder were both kept at 50 rpm. The pressure of $CO_2$ was kept at 7.58~8.27 MPa (1100~1200 psi). The die temperature was kept at 120° C. and the die pressure was in the range of 8.62~9.31 MPa (1250~1350 psi) depending on different samples. The openings of the slit die and shaping die were kept as a constant. Foam samples were cut and removed before entering the rollers to maintain the cell morphology.

Foam Characterization

The specimens for characterization were prepared by cutting segments out of extruded foams and then sanded on a sandpaper to achieve a thickness about 6.5 mm. During this process the skin of the foam was removed. After sanding, compressed air was blown on the foams to remove residual powders. The morphology of the foam was observed by a scanning electron microscope (SEM, Phillips XL30). Samples were cryo-fractured in liquid nitrogen, and the fracture surface was sputter-coated with gold.

Infrared (IR) transmission of each sample was measured using an in-house IR transmission tester to provide a property relevant for thermal insulation applications. This test provided data at a localized point, so the test was performed at several locations on the specimens and the resulting values were averaged. IR transmission is the ratio of power exiting to that entering the sample. The input power was 0.5 Watts for all samples measured. The distance between the optical fiber output of the laser diode and the power meter was about 5 cm.

The thermal conductivity was measured using a heat flow meter (FOX 200, Laser Comp). The temperature difference between the top and bottom plate was set at 40° C.

Results

For the water expandable PS beads, the uniform distribution of water in PS plays a key role in achieving the foam product with desirable structure and properties. To realize this goal, surfactants such as AOT or water-swellable materials, for example starch, were introduced to facilitate the dispersion of water. However, the existence of surfactants and starch will deteriorate the fire resistance property and mechanical strength of the foam. In our case, AC was used as a water carrier and reinforcement material to avoid the use of surfactants and the loss of mechanical strength. Due to their exceptionally high surface area, almost three times the amount of water can be trapped by AC.

The structures of foamed PS beads in the oil bath at 135° C. with different moisture contents are shown in FIGS. 4(a) through 4(d). In the SEM micrographs, the large cavities and the smaller bubbles were formed during the suspension polymerization and the batch foaming process, respectively. It is obvious that the expansion ratio and the cell density increased with increasing water content. For the dried beads, only large cavities were observed, while the smaller bubbles were formed from the nucleation and growth of water vapor. The WEPSAC beads saturated with $CO_2$ at 25° C. were also foamed in the same oil bath in an attempt to enhance the expansion ratio and to lower the foam density. It was found that the expansion ratio greatly increased due to the combination of two blowing agents, i.e., $CO_2$ and water. The cell morphologies are presented in FIGS. 5(a) through 5(d). Although not well-defined, a bi-model foam structure was observed even in the foam made from dried beads. Since $CO_2$ was the sole blowing agent in dried beads, the large bubbles originated from the cavities shown in FIG. 4(a).

The feasibility of using WEPSAC in $CO_2$ in the extrusion foaming process was tested in the twin-screw extruder. Table 1 shows the bulk densities of different foams produced under the same operating conditions. It is clear that the dry AC did not change the foam density while the WEPSAC foam showed a much lower density (0.032 vs. 0.043 g/cc). This observation demonstrates that some water in WEPSAC was able to survive the harsh environment in the extruder and could serve as a co-blowing agent in foam extrusion. Since both water and $CO_2$ served as blowing agents, they produced a foam with a higher expansion ratio and hence a lower bulk density.

TABLE 1

Bulk density of PS/1.0% talc, PS/3.0% AC and water expendable PS/3.0% AC foams

|  | PS/1.0% talc | PS/3.0% AC | Water expendable PS/3.0% AC |
|---|---|---|---|
| Bulk density (g/cc) | 0.043 | 0.043 | 0.032 |

Figure 6A:
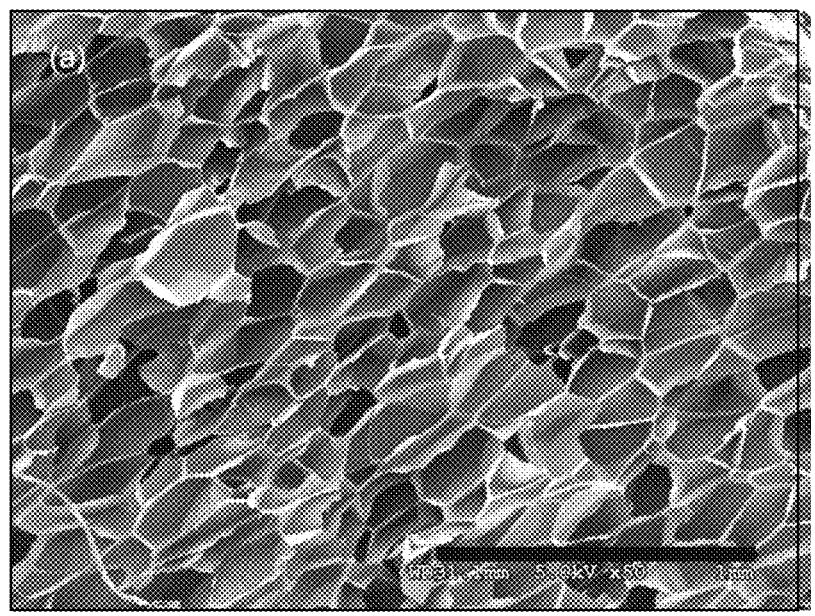
FIGS. 6(a) through 6(c) show examples of foam morphologies and cell size distributions.
Figure 6A:
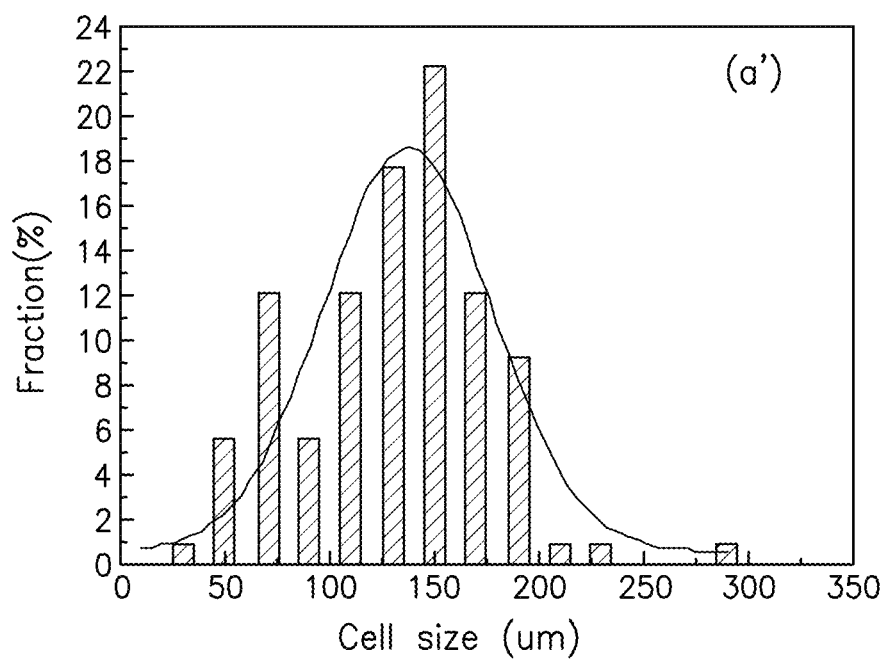
Figure 6B:
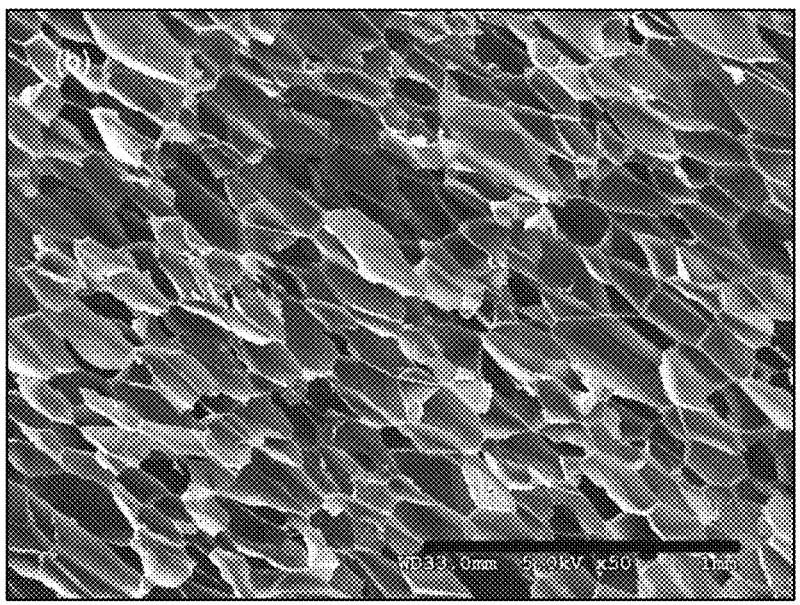
Figure 6B:
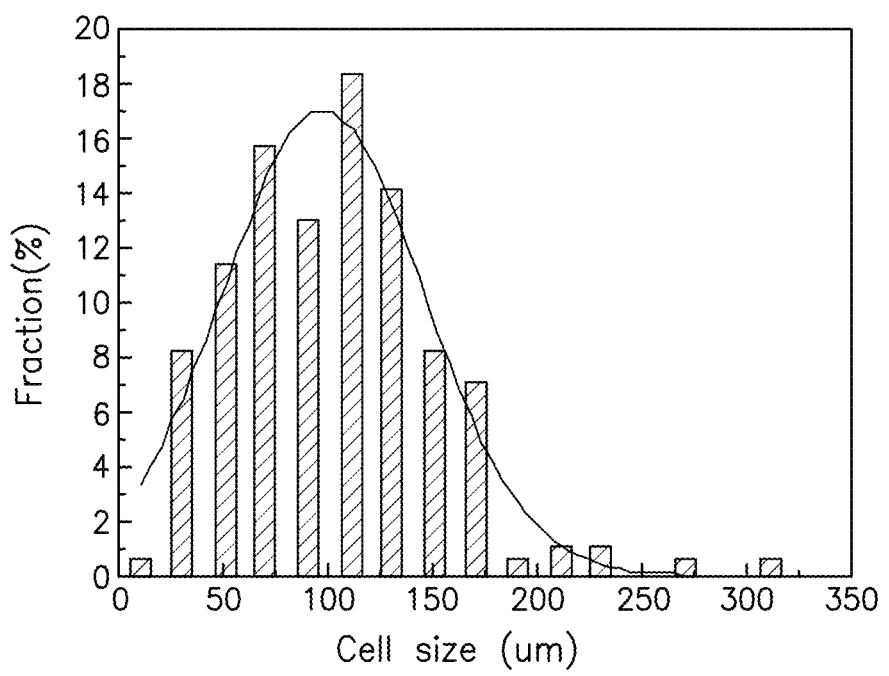
Figure 6C:
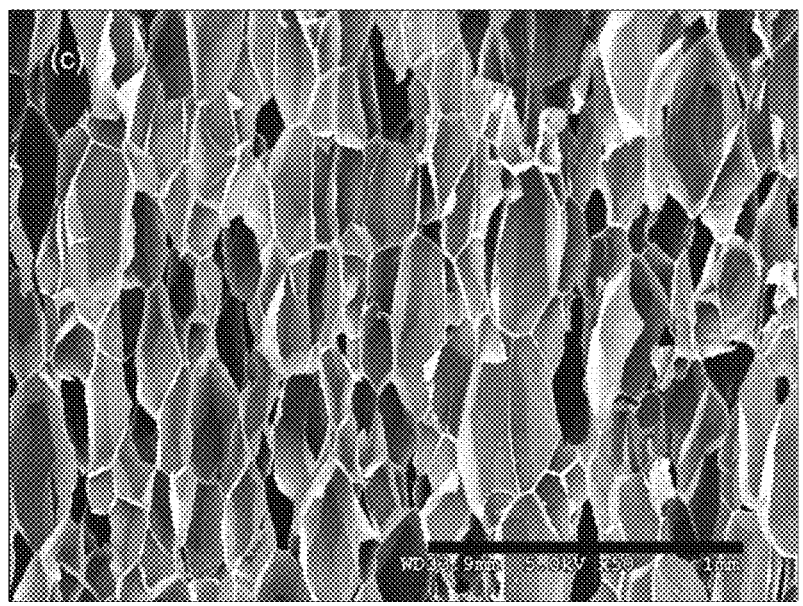
Figure 6C:
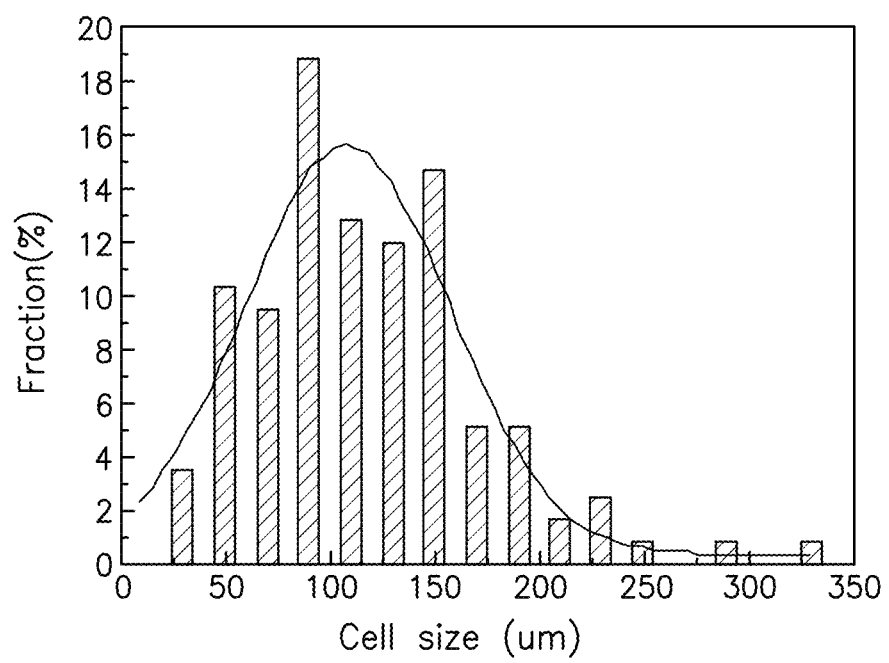

The morphology of extruded foam samples obtained by SEM is shown in FIGS. 6(a) through 6(c). As shown in the images, the PS/3.0 wt % AC foam has the smallest cell size, indicating that AC may act as a nucleating agent. Comparing FIGS. 5(b) and 5(c), the WEPSAC foam shows a larger cell size, which demonstrates that the existence of water helps to enlarge the cell size and reduces the foam density. Cell distribution was analyzed by Scion Image software and a minimum number of 100 cells were counted. The analyzed results are also shown in FIGS. 6(a) through 6(c). It can be seen that the WEPSAC foam has a broader cell distribution and an increased portion of larger cells (>200 um). The large cells are probably created by water.

Figure 7:
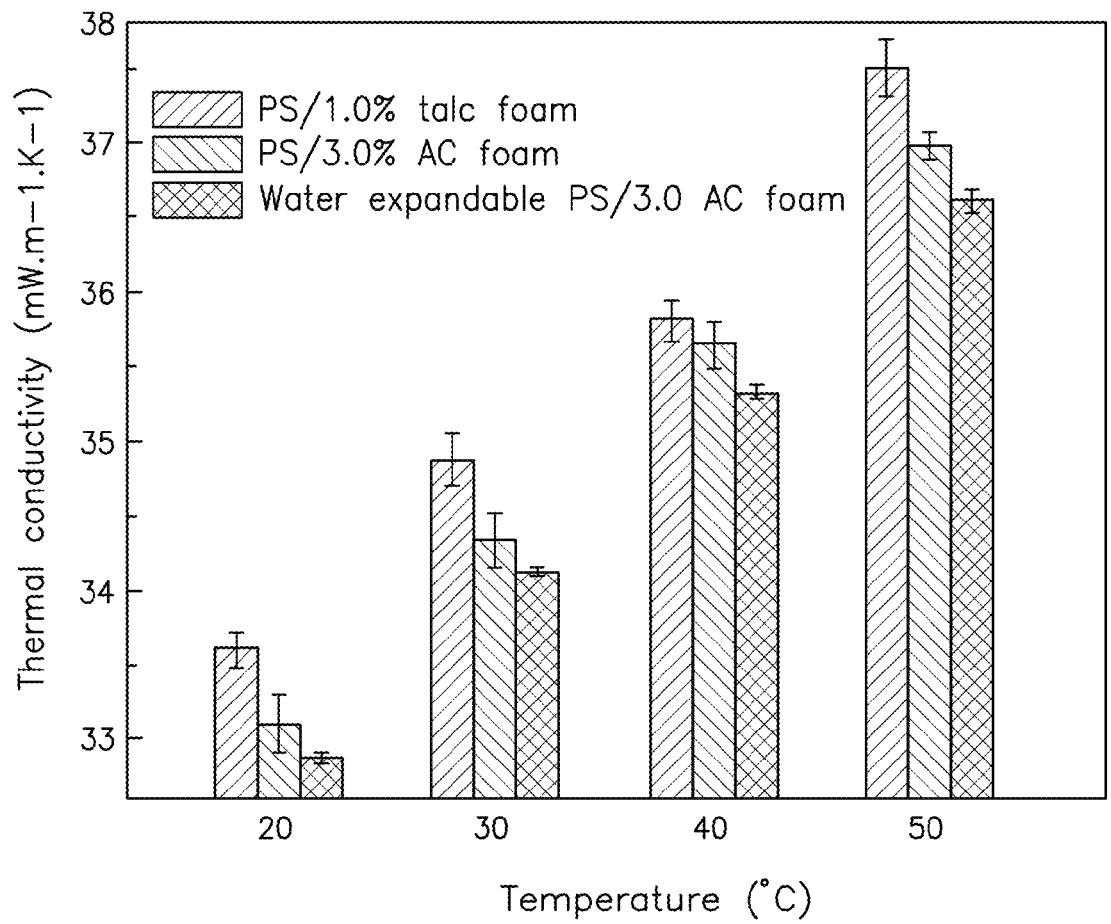
FIG. 7 is a chart of the thermal conductivity of different examples of foams.

The thermal conductivity of foams was measured at various temperatures and the results are presented in FIG. 7. It is clear that the addition of AC decreased the thermal conductivity of PS foams and the WEPSAC foam possessed the lowest value. The overall thermal conductivity ($\lambda$) of a closed-cell foam comprises three components, conduction through the gas phase ($\lambda g$), conduction through the cell wall and the solid struts ($\lambda s$), and thermal radiation ($\lambda r$). Although the lower density decreases $\lambda g$, the addition of AC will increase $\lambda s$. Therefore, the overall thermal conductivity may depend upon $\lambda r$.

Figure 8:
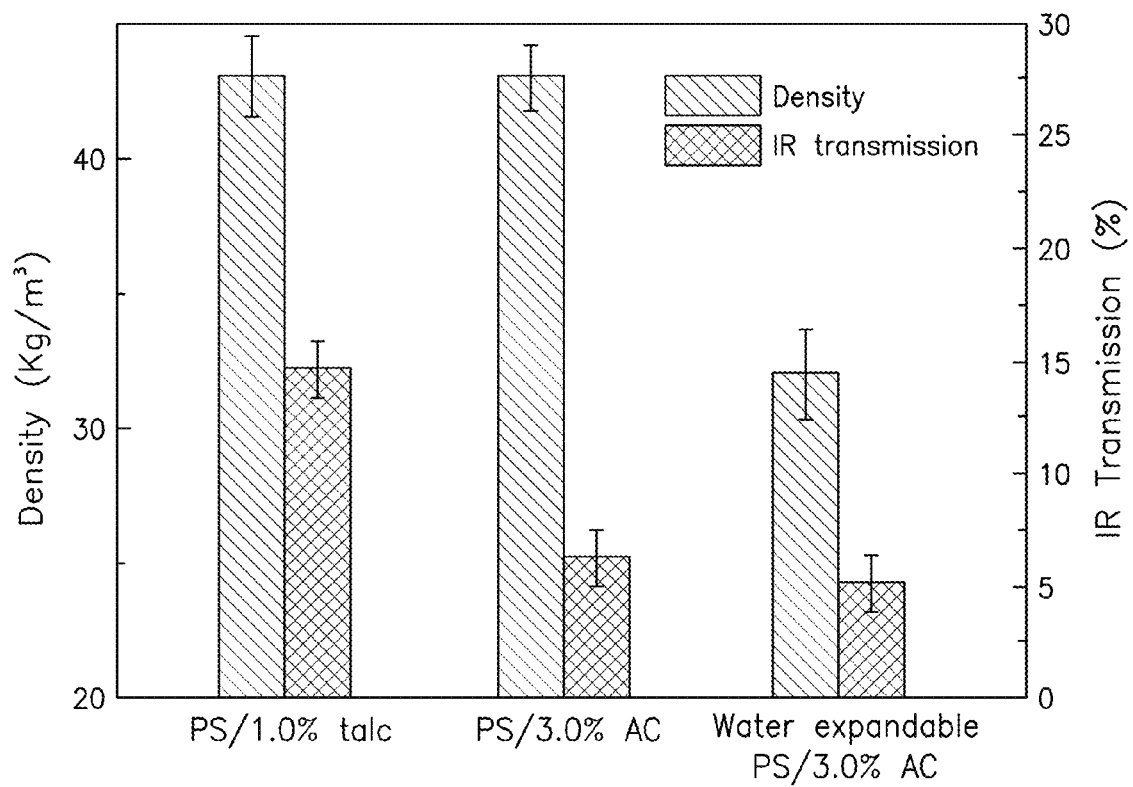
FIG. 8 is a chart of IR absorption at 5 seconds exposure and bulk density of different foam examples.
Figure 9C:
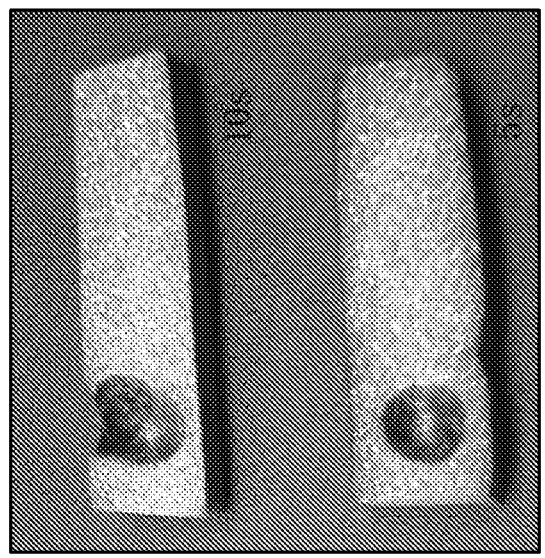
FIGS. 9(a) through 9(c) show pictures of examples after IR absorption with different exposed times.
Figure 9B:
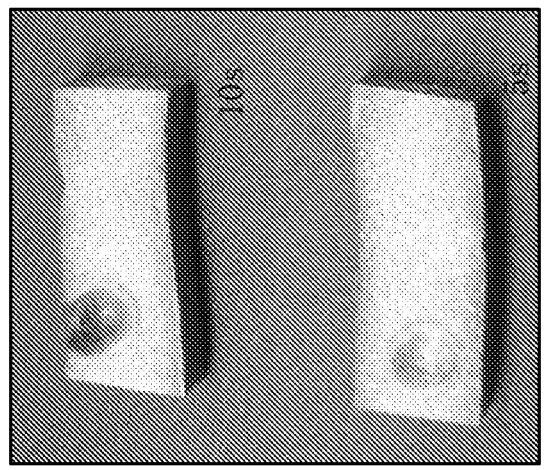
Figure 9A:
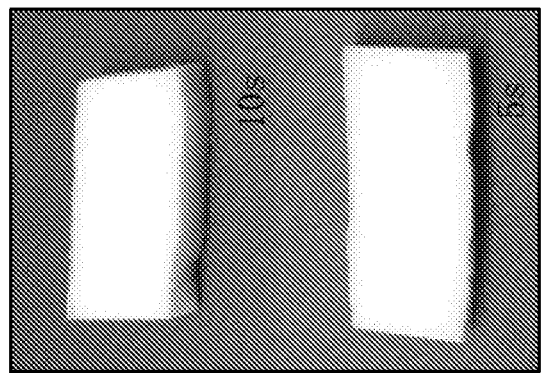

It is well known that carbon is a good IR absorber. FIG. 8 shows the IR transmission of different foams. The foam density is also presented for comparison. The transmission values decreased from 14.6% for pure PS foam to about 6.3% for PS with 3.0 wt % of AC and about 5% for WEPSAC with 3.0 wt % of AC. The difference of IR absorption is further demonstrated in FIGS. 9(*a*) through 9(*c*). During the IR measurement, the temperature of samples increases due to IR absorption. When the temperature was higher than glass transition temperature, the foam would collapse and form a cavity. FIGS. 9(*a*) through 9(*c*) show that the cavity size, corresponding to the heat produced by the IR absorption, increased with the exposed time. Therefore, the cavity size can qualitatively reflect the IR absorption. Comparing the three images, the existence of a cavity on the PS/AC foams verifies the higher IR absorption caused by AC. The larger cavities on the surface of WEPSAC foam samples may imply a better AC dispersion than that in the PS/AC foam.

Conclusions from Example 6

In summary, water expandable PS/AC beads were successfully synthesized via a modified suspension polymerization process. Using AC as the carrier, water was introduced into the beads without emulsifiers. The synthesized WEPSAC beads trapped more water than just adding water containing AC in the PS extrusion foaming process. Water acted as a co-blowing agent, which enlarged the cell size and decreased the foam density in the $CO_2$ extrusion foaming process. With the addition of water containing AC, IR transmission through the foam decreased substantially. Together, the WEPSAC foam showed the lowest thermal conductivity in this study. This new material may be useful for replacing the ozone-depleting blowing agents in thermal insulation foam applications.

The following references are hereby incorporated herein by reference:

(1) Crevecoeur, J. J.; Nelissen, L.; Lemstra P. J. Polymer, 1999, 40, 3685-3689.
(2) Pallay, J.; Kelemen, P.; Berghmans, H.; Van Dommelen, D.; Macromol Mater Eng, 2000, 275, 18-25.
(3) Guo, Z. H.; Yang, J. T.; Wingert, M. J.; Shen, J.; Tomasko, D, L.; Lee, L. J. ANTEC, 2007, 3062-3065.
(4) Martinez-Perez, C. A.; Garcia-Casillas, P. E.; Romero, P.; Juarez, C.; Martinez-Villafane, C. A.; Moller, A. D.; Romero-Garcia, J.; Journal of Advanced Materials 2006, 5-11.
(5) Li, R. H.; White, M.; Williams, S.; Hazlett, T.; Journal of Biomaterials Science, Polymer Edition 1998, 9, 239-258.
(6) Wake, M. C.; Gupta, P. K.; Mikos, A. G.; Cell Transplantation 1996, 5, 465-73.
(7) RP-120X Polymeric Foams-Updated Edition; Business Communications Company, Inc., December 2001.
(8) Han, X. M.; Shen, J; Huang, H. X.; Tomasko, D. L.; Lee, L. J.; Polymer Engineering and Science, 2007, 47, 103-111.
(9) Lee L. J.; Zeng C. C.; Cao X.; Han X. M.; Shen J.; Xu G. J.; Composite Science and Technology, 2005, 65, 2344-2363.
(10) Lee, L. J.; Zeng, C.; Cao, X.; Han, X.; Shen, J.; Xu, G.; Composites Science and Technology 2005, 65, 2344-2363.
(11) Shen, J.; Zeng, C.; Lee, L. J.; Polymer, 2005, 46, 5218-5224.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method of making a foamed polymer, said method comprising:
   (a) preparing a foamable polymeric material precursor comprising:
      (1) an aqueous suspension polymerization of a mixture comprising:
         i. styrene or other monomer;
         ii. solid polymeric material selected from the group consisting of polystyrene;
         iii. foaming facilitating material having affinity for a suspension liquid, said foaming facilitating material selected from the group consisting of activated carbon, said foaming facilitating material adapted to absorb said suspension liquid in the absence of any surfactant-like molecules or polymers;
         iv. selected additional material selected from the group consisting of 1-dimensional nano/micro-materials;
         v. a suspension stabilizer selected from the group consisting of hydroxyethyl cellulose; and
         vi. said suspension liquid selected from the group consisting of water; and
      (2) a blowing agent selected from the group consisting of $CO_2$, $N_2$, hydrofluorocarbons, fluorocarbons, and mixtures thereof; and
   (b) preparing a foamed polymer by a method selected from the group consisting of extrusion, injection molding, and batch foaming of said foamable polymeric material precursor.

2. A method according to claim 1 wherein said suspension liquid is absorbed by said foaming facilitating material before mixing with said styrene or other monomer or said polymeric material and starting suspension polymerization.

3. A method according to claim 1 wherein said solid polymeric material is present in an amount less than 65% by weight, based on a total amount of said styrene and said solid polymeric material.

4. A method according to claim 1 wherein said suspension liquid is present in an amount of from 10% to 400% by weight, based on said foaming facilitating material.

5. A method according to claim 1 wherein said foaming facilitating material is present in an amount of from about 20% to about 0.01% by weight, based on a total amount of said styrene and said solid polymeric material.

6. A method according to claim 1 wherein a ratio of said activated carbon to a total amount of said styrene and said polystyrene is in a range of from about 20% to about 0.01% by weight.

7. A method according to claim 1 wherein said foaming facilitating material is selected from the group consisting of activated carbon with an average particle size from 1 micrometer to 40 micrometers.

8. A method according to claim 1 wherein said additional material comprises a 1-dimensional nano/micro-material selected from the group consisting of smectite clays, organoclays, nanographites, graphite, graphene, and graphene oxide.

9. A method according to claim 1 wherein a ratio of said additional material to a total weight of said styrene and said solid polymeric material is in an amount less than 20% by weight.

10. A method of making a foamed polymer, said method comprising:
   (a) preparing a foamable polymeric material precursor comprising:
      (1) an aqueous suspension polymerization of a mixture comprising:
         i. styrene or other monomer;
         ii. solid polymeric material selected from the group consisting of polystyrene;
         iii. foaming facilitating material having affinity for a suspension liquid, said foaming facilitating material selected from the group consisting of activated carbon, said foaming facilitating material adapted to absorb said suspension liquid in the absence of any surfactant-like molecules or polymers;
         iv. selected additional material selected from the group consisting of 1-dimensional nano/micro-materials;
         v. a suspension stabilizer selected from the group consisting of hydroxyethyl cellulose; and
         vi. said suspension liquid selected from the group consisting of water; and
      (2) a blowing agent comprising $CO_2$; and
   (b) preparing a foamed polymer by a method selected from the group consisting of extrusion, injection molding, and batch foaming of said foamable polymeric material precursor.

11. A method according to claim 10 wherein said suspension liquid is absorbed by said foaming facilitating material before mixing with said styrene or other monomer or said polymeric material and starting suspension polymerization.

12. A method according to claim 10 wherein said solid polymeric material is present in an amount less than 65% by weight, based on a total amount of said styrene and said solid polymeric material.

13. A method according to claim 10 wherein said suspension liquid is present in an amount of from 10% to 400% by weight, based on said foaming facilitating material.

14. A method according to claim 10 wherein said foaming facilitating material is present in an amount of from about 20% to about 0.01% by weight, based on a total amount of said styrene and said solid polymeric material.

15. A method according to claim 10 wherein a ratio of said activated carbon to a total amount of said styrene and said polystyrene is in a range of from about 20% to about 0.01% by weight.

16. A method according to claim 10 wherein said foaming facilitating material is selected from the group consisting of activated carbon with an average particle size from 1 micrometer to 40 micrometers.

17. A method according to claim 10 wherein said additional material comprises a 1-dimensional nano/micro-material selected from the group consisting of smectite clays, organoclays, nanographites, graphite, graphene, and graphene oxide.

18. A method according to claim 10 wherein a ratio of said additional material to a total weight of said styrene and said solid polymeric material is in an amount less than 20% by weight.

* * * * *